(12) United States Patent
Guo et al.

(10) Patent No.: US 10,884,648 B2
(45) Date of Patent: *Jan. 5, 2021

(54) TEMPORARY RELOCATION OF DATA WITHIN LOCAL STORAGE OF A DISPERSED STORAGE NETWORK

(71) Applicant: International Business Machines Corporation, Armonk, NY (US)

(72) Inventors: Ying Z. Guo, Palatine, IL (US); Ilya Volvovski, Chicago, IL (US); Jason K. Resch, Chicago, IL (US); Manish Motwani, Chicago, IL (US); Ethan S. Wozniak, Park Ridge, IL (US); Praveen Viraraghavan, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,464

(22) Filed: Sep. 16, 2019

(65) Prior Publication Data
US 2020/0379666 A1    Dec. 3, 2020

Related U.S. Application Data

(63) Continuation of application No. 16/429,517, filed on Jun. 3, 2019.

(51) Int. Cl.
*G06F 3/06* (2006.01)
*G06F 3/00* (2006.01)
(Continued)

(52) U.S. Cl.
CPC .......... *G06F 3/0647* (2013.01); *G06F 3/0604* (2013.01); *G06F 3/067* (2013.01);
(Continued)

(58) Field of Classification Search
None
See application file for complete search history.

(56) References Cited

U.S. PATENT DOCUMENTS 6,205,565 B1   3/2001   Bissett et al.
8,392,678 B2   3/2013   Inoue et al.
(Continued)

FOREIGN PATENT DOCUMENTS

EP   1162537 A1   12/2001

OTHER PUBLICATIONS

Klein et al.; Optimizing a Highly Fault Tolerant Software RAID for Many Core Systems; 2009 International Conference on High Performance Computing & Simulation; Jun. 21-24, 2009; 6 pgs; IEEE.
(Continued)

*Primary Examiner* — Justin R Knapp
(74) *Attorney, Agent, or Firm* — James Nock; Andrew D. Wright; Roberts Calderon Safran & Cole, P.C.

(57) ABSTRACT

A method for execution by a storage unit includes identifying, from a plurality of memory devices of the storage unit, a first memory device that is designated for storage of a first data slice to be written of the storage unit based on determining a slice name of the first data slice compares favorably to a namespace assigned to the first memory device. A function is performed on the slice name of the first data slice to identify a second memory device from the plurality of memory devices of the storage unit for temporary storage the first data slice in response to determining that the first memory device is unavailable and the first data slice is stored in the second memory device in response. The first data slice is migrated to storage in the first memory device in response to determining that the first memory device is available.

20 Claims, 11 Drawing Sheets

(51) Int. Cl.
*G06F 11/10* (2006.01)
*H03M 3/00* (2006.01)

(52) U.S. Cl.
CPC .......... *G06F 3/0644* (2013.01); *G06F 3/0659* (2013.01); *G06F 11/1076* (2013.01)

(56) References Cited

U.S. PATENT DOCUMENTS

| | | |
|---|---|---|
| 8,977,893 B2 | 3/2015 | Samanta et al. |
| 9,176,822 B2 | 11/2015 | Vedpathak et al. |
| 9,542,272 B2 | 1/2017 | Krishnamurthy et al. |
| 2018/0107552 A1* | 4/2018 | Motwani ................. G06F 3/067 |

OTHER PUBLICATIONS

Office Action dated May 15, 2020 in U.S. Appl. No. 16/429,517, 7 pages.
List of IBM Patents or Patent Applications Treated as Related, dated Aug. 17, 2020, 1 page.
Specification "Temporary Relocation of Data Within Local Storage of a Dispersed Storage Network" and drawings in related U.S. Appl. No. 16/429,517, filed Jun. 3, 2019, 68 pages.
Notice of Allowance in U.S. Appl. No. 16/429,517 dated Sep. 10, 2020, 5 pages.

* cited by examiner

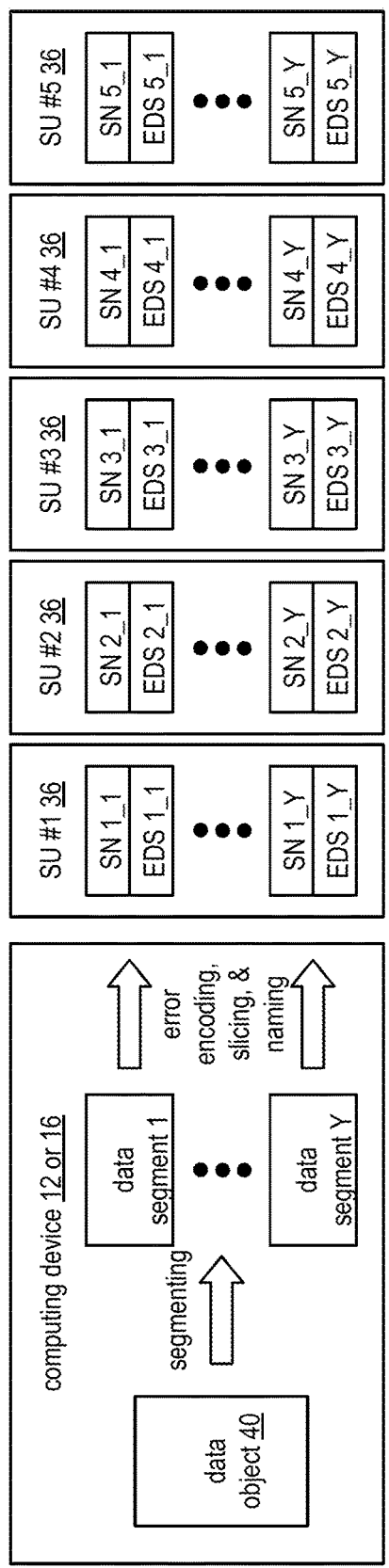
FIG. 3
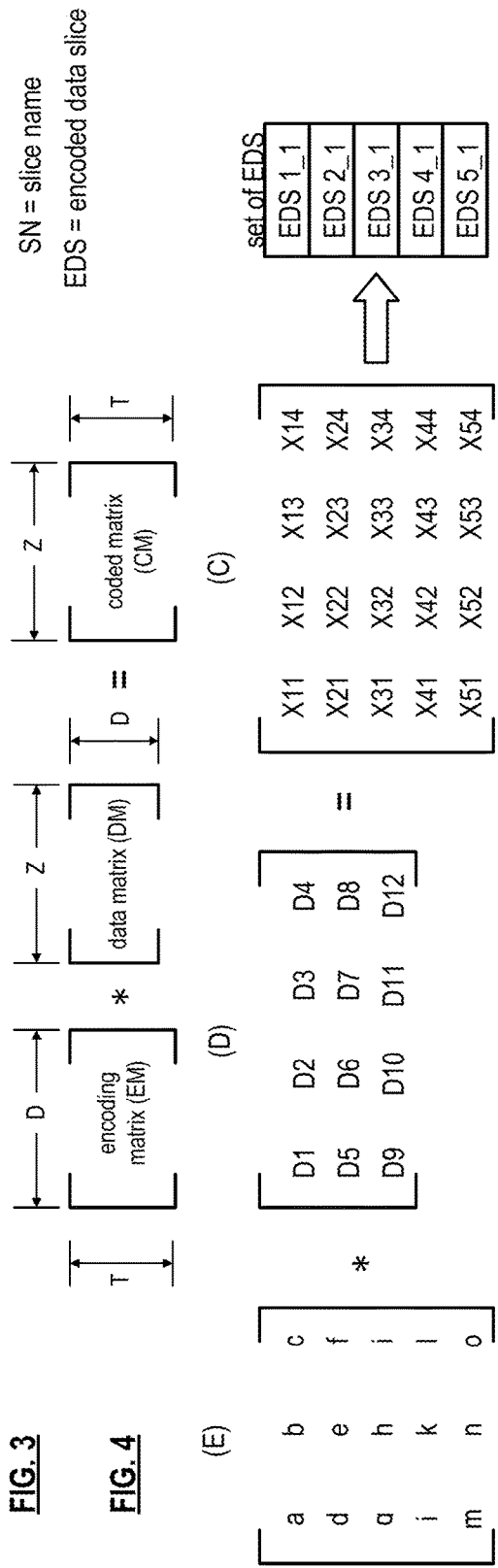
FIG. 4
FIG. 5
FIG. 6

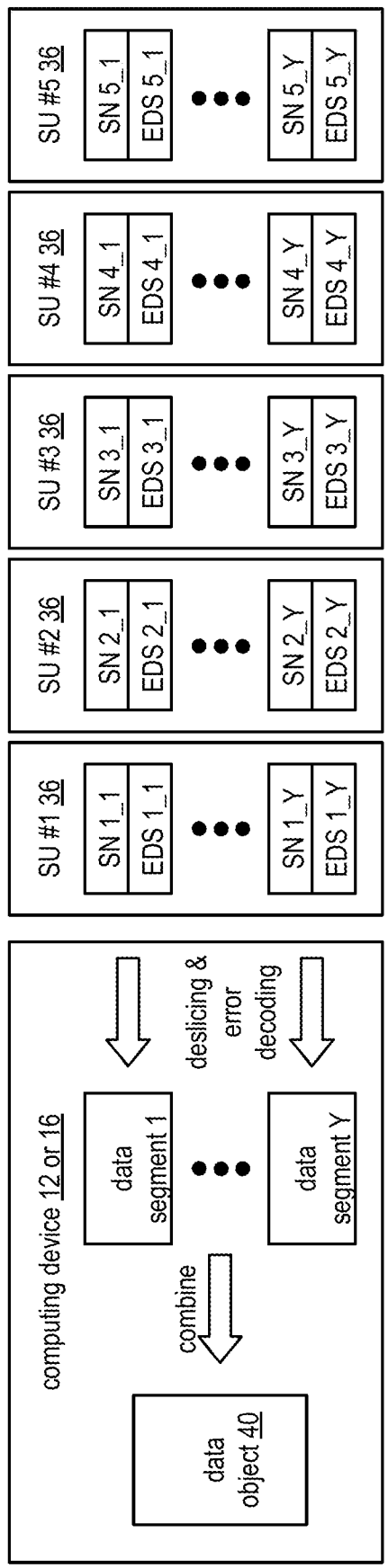

TEMPORARY RELOCATION OF DATA WITHIN LOCAL STORAGE OF A DISPERSED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

DETAILED DESCRIPTION OF THE INVENTION

Figure 1:
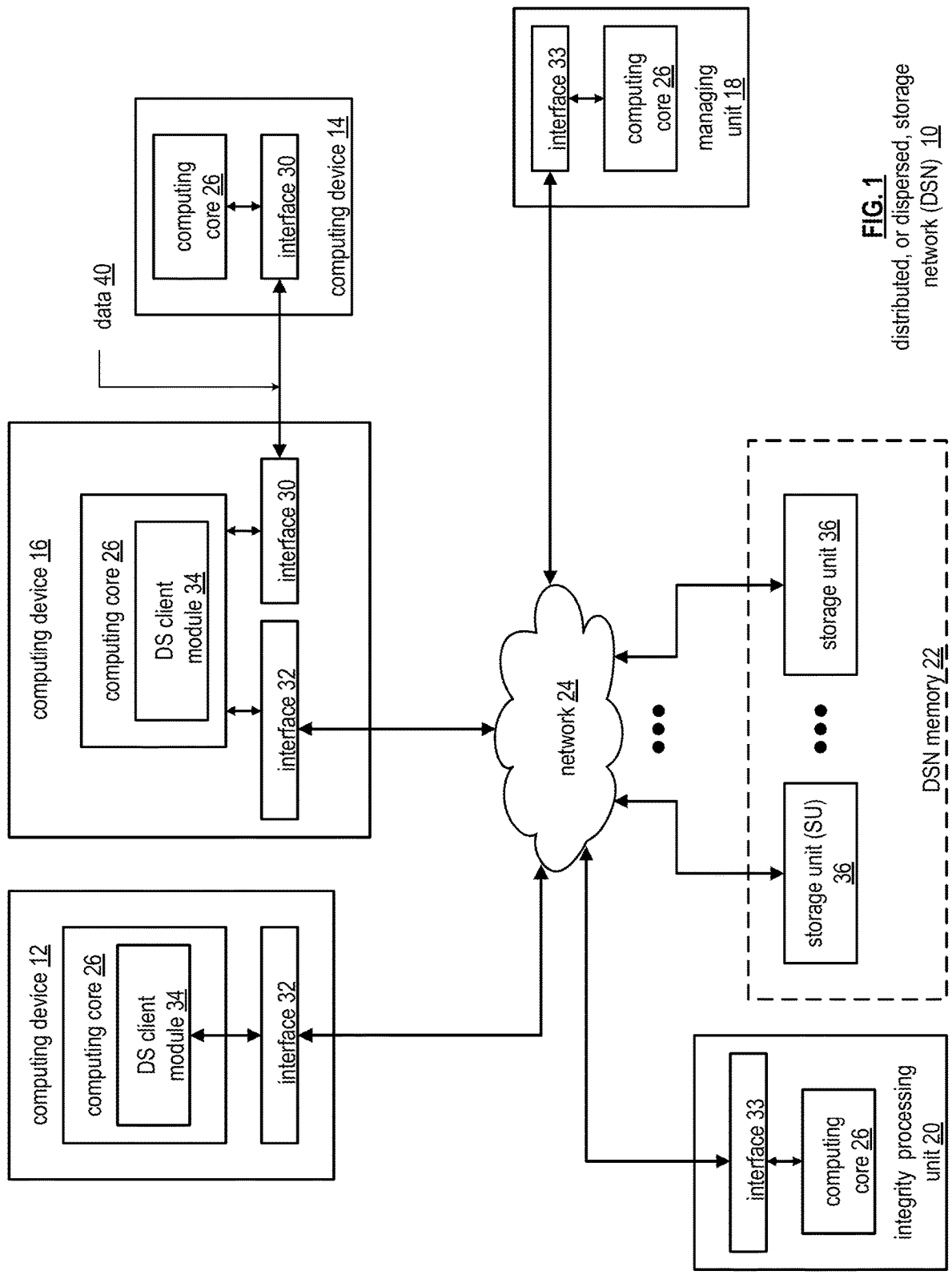
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; one or more satellite communication systems; one or more fiber optic communication systems; and/or one or more local area networks (LAN) and/or wide area networks (WAN).

Figure 2:
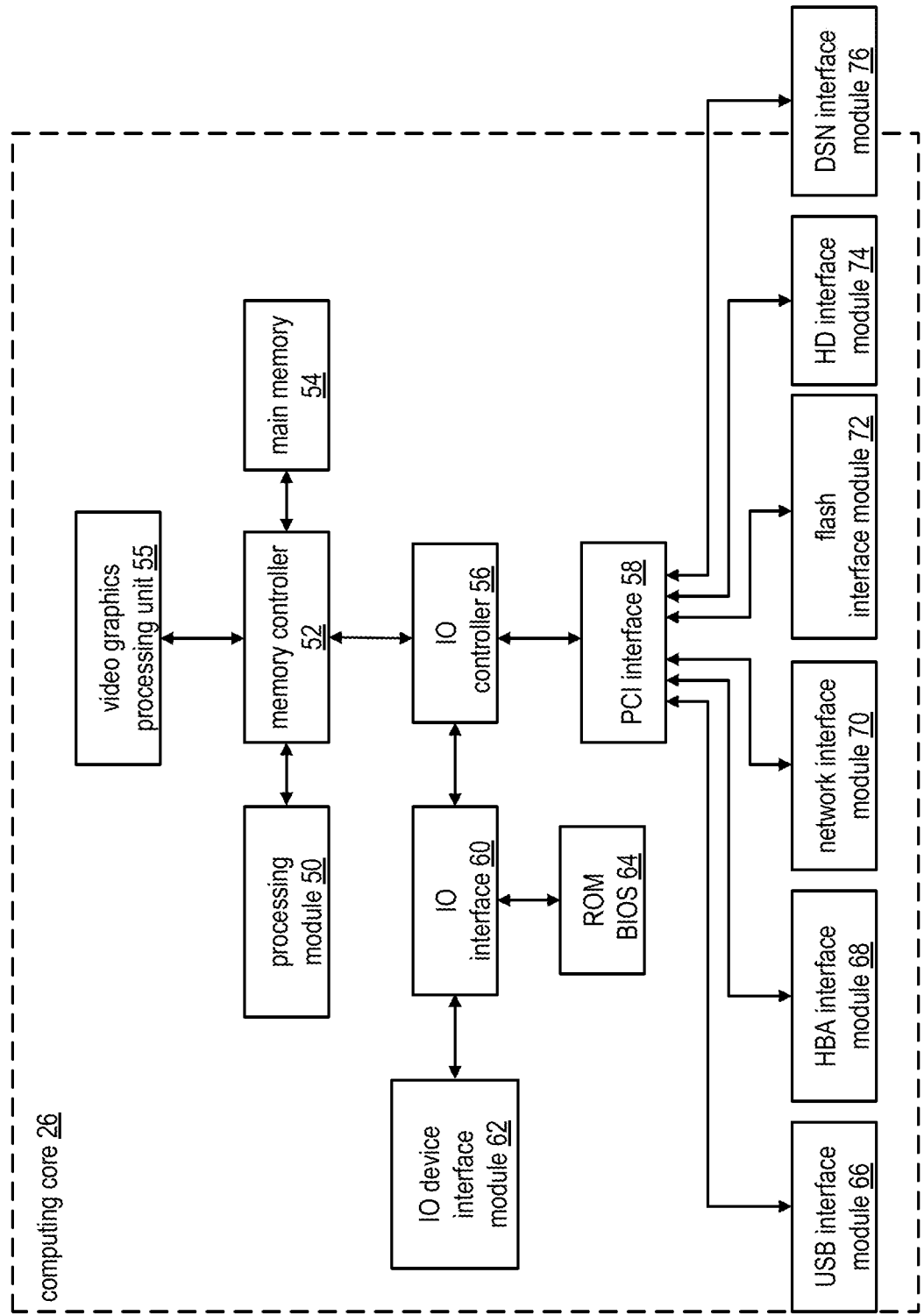
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.). As used herein, the dispersed storage error encoding parameters can be interchangeably referred to as IDA parameters, and T can be interchangeable referred to an IDA width threshold of a dispersed storage error encoding function.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
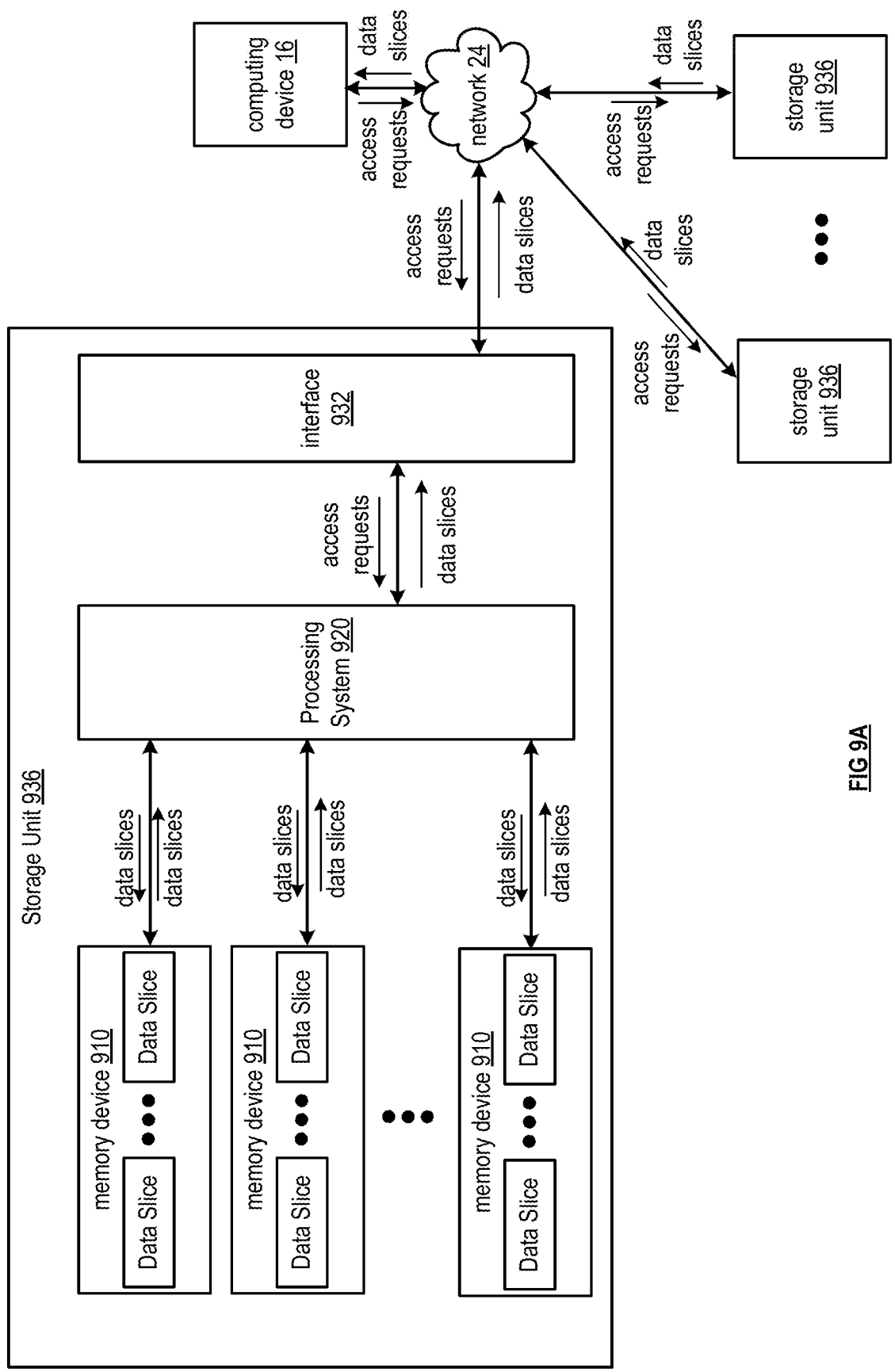
FIG. 9A is a schematic block diagram of an embodiment of a dispersed or distributed storage network (DSN) in accordance with the present invention.

FIG. 9A is a schematic block diagram of another embodiment of a dispersed storage network (DSN) that includes at least one computing device 16 of FIG. 1, the network 24 of FIG. 1, and at least one storage unit 936. The computing device 16 can function as a dispersed storage processing agent for computing device 14 as described previously. Each storage unit 936 may be implemented utilizing the storage unit 36 of FIG. 1, can implemented as DST execution units as discussed herein, and/or can be operable to store dispersed error encoded data and/or to execute, in a distributed manner, one or more tasks on data.

Each storage unit 936 can include an interface 932 operable to receive communications via network 24. Each storage unit 936 can include a plurality of memory devices, each of the same or different type and/or of the same or different memory capacity. The processing system 920 can include a memory and at least one processor, and can be implemented by utilizing the computing core 26 of FIG. 2. The processing system 920 can be operable to perform the operations and/or functionality of the storage unit 936 as discussed herein. In particular, each storage unit 936 can be operable to temporarily relocate data locally amongst its set of memory devices 910, for example, when memory devices fail and/or become unavailable. In some embodiments, some or all of the operations performed by the processing system 920 can be determined by the storage unit 936 and/or can be performed in response to instructions received via the network, for example, from at least one computing device 16.

The access requests sent by the at least one computing device 16 can include data slices to be written to storage, read requests, and/or task requests. The user device 14 and/or computing device 16 can receive data slices stored by the storage units in response. One or more computing devices 16 and/or user devices 14 can generate the data slices for storage by performing a dispersed storage error encoding function on a set of data segments for storage, where the encoded data slices of a data segment are transmitted to an information dispersal algorithm (IDA) width threshold number of storage units 936. For example, the computing device can generate write requests that include these encoded data slices for transmission to these storage units 936, and these encoded data slices can be written to storage by corresponding storage units 936 in response to receiving the write requests from the computing device 16 via the network.

One or more computing devices 16 and/or user devices 14 can recover a data segment by retrieving at least an IDA decode threshold number of encoded data slices from at least a corresponding IDA decode threshold number of storage units 936, and by performing a dispersed storage error decoding function on the received encoded data slices. For example, read requests indicating these encoded data slices can be generated by the computing device 16 for transmission to these corresponding storage units 936, and the storage units 936 can read and transmit the corresponding encoded data slices to the computing device 16.

Some or all of the storage units 936 can thus be operable to store these encoded data slices, or other data slices, in its own set of memory devices 910. Each of the memory devices 910 can occupy a portion of a source name range, where the entirety of the source name range indicates which storage units and/or which memory devices of a particular storage unit each of a plurality of data slices are designated for storage within, based on its corresponding source name. For example, the source names of data slices can be assigned and/or generated as a result of performing the dispersed storage error encoding function to designate the resulting encoded data slices for storage in the corresponding IDA width threshold number of storage units. The portion of a source name range occupied by a particular memory device 910 corresponds to the namespace of this particular memory device 910.

Figure 9B:
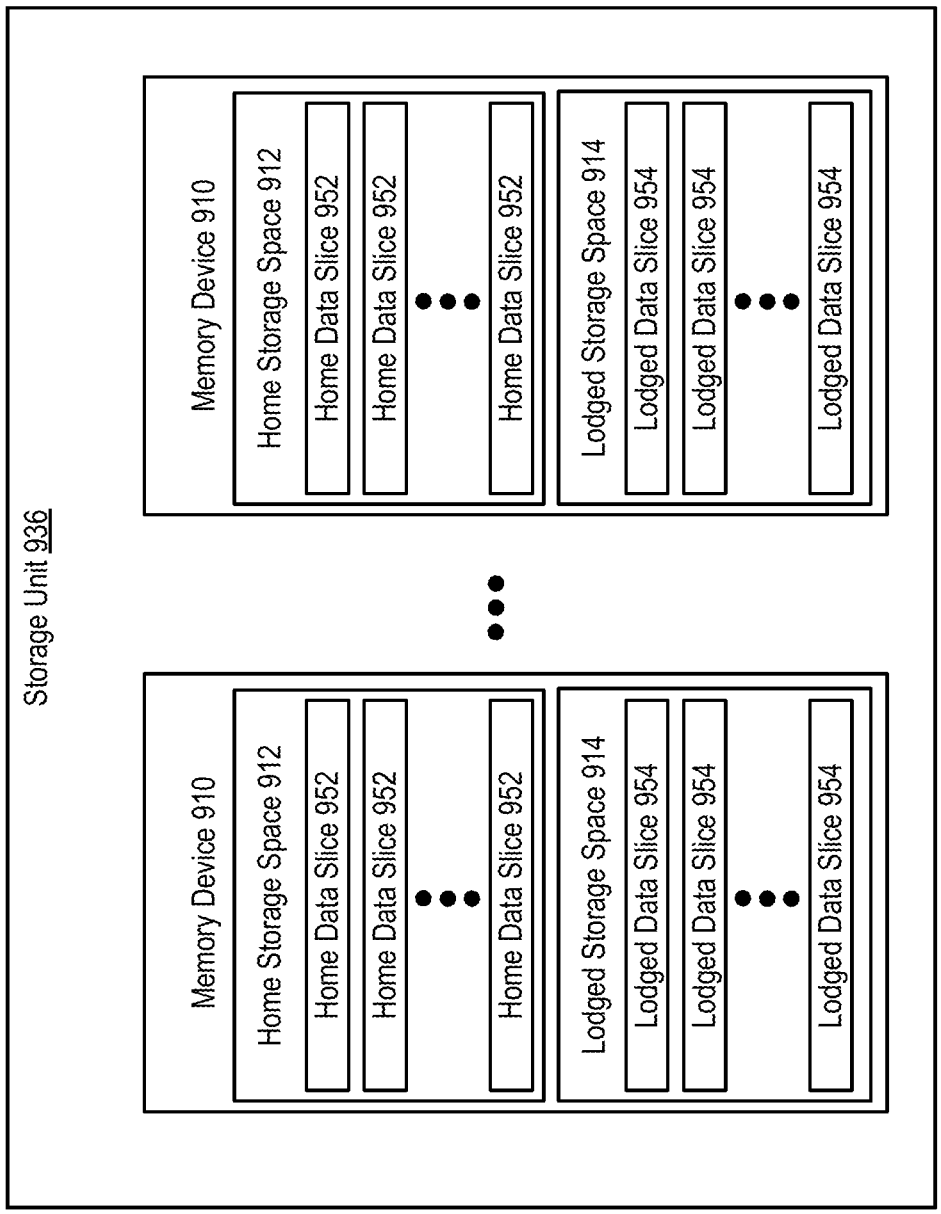
FIG. 9B is a schematic block diagram of an embodiment of a storage unit in accordance with the present invention.

As illustrated in FIG. 9B, each of the memory devices 910 can have its storage space divided into a first type of storage space and a second type of storage space. As used herein, the first type of storage space of one or more memory devices will be referred to as the "home storage space", and the second type of storage space of the one or more memory devices will be referred to as the "lodged storage space", as illustrated in FIG. 9 as home storage space 912 and lodged storage space 914. The home storage space and the lodged storage space of a memory device can be mutually exclusive and collectively exhaustive with respect to the total storage space of the memory device.

The home storage space of a memory device can store data slices designated for storage in the memory device. In particular, the home storage space of a memory device can be designated to store data slices with corresponding slice names and/or other source names that are included within, or otherwise compare favorably to, the namespace for the memory device. These data slices stored in the home storage space will be interchangeably referred to as "home data slices". Home data slices 952 are each stored in the home storage space of their intended memory device, as indicated by the source name of the home data slices comparing favorably to the namespace of the memory device. For example, home data slices 952 are stored in their intended memory device for permanent storage, until their corresponding source name changes, and/or until the namespace of the memory device changes. Thus, the namespace of a memory device designates which data slices are intended for storage in its home storage space. As used herein, this namespace of the memory device can be interchangeably referred to as the "home namespace" of the memory device.

Figure 9C:
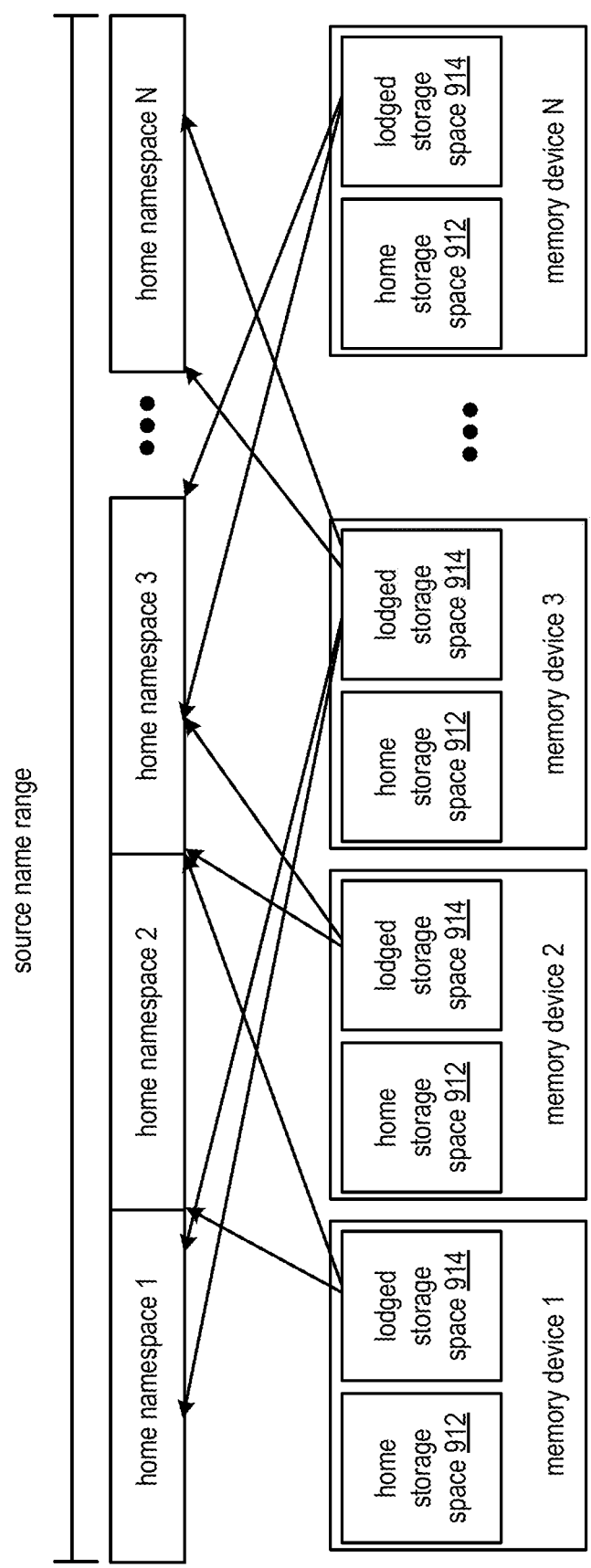
FIG. 9C illustrates an example embodiment of a mapping of an entire source name range to home namespaces and lodged namespaces in accordance with the present invention.

FIG. 9C illustrates an example of how the entire source name range for a particular storage unit 936 is divided into home namespaces 1-N, each utilized as the home namespace for the corresponding one its set of memory devices 1-N. Home namespaces 1-N can representing consecutive and/or mutually exclusive portions of the entire source name range. The home namespaces 1-N can be collectively exhaustive with respect to the entire source name range. As illustrated in FIG. 9C, each home namespace 1-N can correspond to the namespace utilized to dictate the slice names for data slices designated for storage in the home storage space of the corresponding memory device, where home storage space 1 utilizes home namespace 1, where home storage space 2 utilizes home namespace 2, and so on. Thus, data slices with slice names that fall within home namespace 1 are designated for storage in memory device 1, data slices with slice names that fall within home namespace 2 are designated for storage in memory device 2, and so on.

The lodged storage space of a memory device can store data slices designated for storage in a different memory device of the storage unit, as illustrated in FIG. 9B. In particular, the lodged storage space of a memory device can be designated to store data slices with corresponding source names that are not included within, or otherwise compare unfavorably to, the home namespace of the memory device. These data slices stored in the lodged storage space will be interchangeably referred to as "lodged data slices". Lodged data slices 954 are not stored in their intended memory device in accordance with their source name, as indicated by the source name of the home data slices comparing favorably to the namespace of a different memory device from the memory device in which it is stored. Each lodged data slice 954 is instead temporarily stored in the lodged storage space of another memory device that is different from the intended memory device. For example, the lodged data slices are stored in the other memory device in response to their intended memory device being unavailable. These lodged data slices still maintain their original source names and/or otherwise maintain their identifiers.

Once the intended memory device is again available, the lodged data slice can be migrated from the other memory device to the intended memory device for storage in the home storage space of the intended memory device. Once migrated, the lodged data slice 954 can thus become a home data slice 952, as it will be stored in the home storage space of its intended memory device. Similarly, if a memory device storing home data slices 952 in its home storage space 912 becomes unavailable, becomes unhealthy, and/or if the storage unit otherwise determines migration of slices stored by the home memory device is necessary, these home data slices 952 can be transferred to another memory device for storage in its lodged storage space 914, and thus become lodged data slices 954 until their intended memory device is again available and these data slices can again be stored by the intended memory device. As this migration of data slices can occur between memory devices in the set of memory devices within the same storage unit, the processing system 920 of the storage unit itself can facilitate this local transfer of data slices between its memory devices accordingly.

By utilizing lodge storage space to temporarily store data while the corresponding home storage space in the same storage unit is unavailable, unnecessary network traffic in the DSN can be reduced. This mechanism can further provide an efficient and scalable localized fault tolerance, isolation, and recovery mechanism without invoking expensive hardware and network overhead in the rebuild process. In this fashion, high-level health monitoring duties can be delegated to the storage units of the DSN to isolate and repair its memory device unavailability. An issue would be escalated to a high-level health monitoring system of the DSN only if it cannot be contained locally by a storage unit itself, thus providing a scalable recovery capability.

As illustrated in FIG. 9C, the lodged storage spaces of memory devices 910 can have their own namespaces, which can correspond to the namespaces of at least one other memory device and/or can correspond to portions of the entire source name range of the storage unit 936 that are not included in the home namespace of the memory device. As used herein, these namespaces of the lodged storage spaces of a memory device can be interchangeably referred to as "lodged namespaces" of the memory device. The lodged namespaces can be utilized to determine which memory device data slices of a different, unavailable memory device should be stored as lodged data slices. For example, as illustrated in FIG. 9C, the lodged namespace of memory device 1 of a storage unit 936 can correspond to the home namespace of memory device 2 of the storage unit. When the processing system 920 of the storage unit determines memory device 2 is unavailable, will be unavailable soon, and/or is unhealthy, home data slices of the memory device 2 and/or other data slices intended for storage in memory device 2 can be transferred by the processing system 920 for storage in the lodged storage space of memory device 1 in response to the lodged namespace of the memory device 1 including the home namespaces of memory device 2.

A lodged namespace can include proper subsets and/or the entirety of one or more home namespaces of other memory devices. The entirety of a home namespace can be included in a single lodged namespace for a single memory device. For example, as illustrated in FIG. 9C and discussed above, the entirety of the home namespace for memory device 2 maps to the entirely of the lodged namespace of memory device 1. In some embodiments, each entire home namespace maps to exactly one lodged namespace. In some embodiments, each entire lodged namespace maps to exactly one home namespace.

Alternatively, a plurality of proper subsets of a home namespace can be included in a corresponding plurality of lodged namespaces of multiple memory devices. For example, as illustrated in FIG. 9C, the lodged namespace for memory device 2 can correspond to only a portion of the home namespace for memory device 3, for example, where the lodged namespace for memory device N corresponds to the remainder of the home namespace for memory device 3. As another example, the lodged namespace for memory device 3 can correspond to a portion of the home namespace of memory device 1, as well as a portion of the home namespace of memory device N. The intersection of a lodged namespace and home namespace of the same memory device can be null, for example, where every memory device of the storage unit 936 has a lodged namespace that is entirely distinct from its home namespace.

In some embodiments, the home storage space and lodged storage space are not distinctly separate and/or are not designated portions of memory. In such embodiments, the home storage space and lodged storage space for a memory device as described herein is instead representative of the corresponding home namespaces and lodged namespaces utilized to determine which source names that the memory device is configured to store.

A storage unit can assign, determine, and/or lookup the home namespaces and the lodged namespaces of each of its memory devices, for example, in a lookup table, based on locally determined factors, and/or based on namespace instructions received via the network. The home namespaces and/or the lodged namespaces can be permanent or dynamic, for example, where lodged namespaces change over time based on current health of storage units and/or current memory capacity of storage units.

In some embodiments, a lodging affinity function can be performed by the storage unit to generate and/or determine home and/or lodging namespaces for each of the set of memory devices, and/or to otherwise determine where a data slice should be read from and/or written to, based on its slice name. Performing the lodging affinity function can include utilizing a look-up table and/or performing a hash function, for example, on identifiers of the memory devices and/or source names of received data slices. In some embodiments, the lodged namespace of each memory device can determined as a deterministic function of the home namespace of the memory device. Alternatively or in addition, the home namespace of each memory device can determined as a deterministic function the lodged namespace of the memory device. The lodged namespaces can change and/or be reassigned by the storage unit over time in response to changing conditions such as failure rates of memory devices, storage availability of memory devices, and/or other factors that dictate the lodged namespaces should change, for example, to balance the storage of lodged data slices across the storage units.

In some cases, the lodged namespaces of memory devices in a storage unit can be mutually exclusive and/or collectively exhaustive with respect to the entire source name range, and/or can further map to the lodged namespace of the entirety of one or more home namespaces. This can be advantageous, as it dictates a deterministic mapping of home namespaces to lodged namespaces, allowing the processing system to deterministically identify which memory device to store and/or recover lodged data slices as a function of their source names.

Alternatively, having lodged namespaces that are not mutually exclusive can be advantageous for different reasons, as data slices designated for home storage space of an unavailable memory device can have multiple options for memory devices to be stored. This can aid in ensuring that these data slices will have a designated memory device to be stored as lodged slices even when multiple memory devices are unavailable, including at least one memory device that has a lodged namespaces that include the source names of these data slices. In some embodiments, the storage unit stores, for some or all memory devices, a ranking of a plurality of memory devices with lodged namespaces that include the home namespace of the corresponding memory device. The highest ranked one of the of the set of memory devices of the corresponding memory device that is determined to be available itself is designated for storage of newly written data intended for the corresponding memory device and/or data to be transferred from the corresponding memory device when the corresponding memory device is unavailable or soon to be unavailable. Alternatively, the lodged namespaces can be changed dynamically by the storage unit to account for new failures and/or changes in storage capacity of memory devices.

The entire source name range can be uniformly distributed across the set of memory devices of a storage unit to assign and/or otherwise determine the home namespace and/or lodge namespace for each of the set of memory devices, where each of the set of memory devices are assigned equal portions of the entire source name range for their respective home namespace and/or lodge namespace. Each of the set of memory devices can be assigned unequal portions of the entire source name range for their home namespace and/or lodge namespace, where the size of the unequal portion of the entire source name range for a memory device is determined as a function of their memory capacity, memory allotted to home storage space and/or lodged storage space, memory type, expected failure rate, current health, and/or other characteristics of the memory device.

In some embodiments, the ratio of memory allotted to home storage space to memory allotted to lodged storage space is the same for all memory devices, and/or can be different for different memory devices as a function of memory capacity, memory type, expected failure rate, current health, and/or other characteristics of the memory device. The amount of memory allotted to lodged storage spaces can small and/or can be substantially less than the amount of memory allotted to home storage space in some or all memory devices. The amount of memory allotted to the lodge storage space in memory devices, and/or fraction of total memory capacity of the memory devices allotted to the lodge storage space, can be a function of the historical and/or expected failure rate of the system, such as the historical and/or expected rate of failure and/or other unavailability of memory devices in the storage unit. For example, a first storage unit with a higher expected and/or historical failure rate can have a higher amount of lodged storage space allotted in its memory devices than a second storage unit with a lower higher expected and/or historical failure rate for its memory devices. The amount of memory allotted to lodged storage space of a memory device, and/or the size of the corresponding lodged namespace, can be dynamic based on memory capacity, memory type, expected failure rate, current health, and/or other characteristics of the memory device and/or of other memory devices in the system.

The storage unit can execute write requests to write data slices received for storage by first determining the intended memory device for a data slice to be written, for example, as a function of the source name of the data slice and/or by otherwise looking up or determining which memory device includes a home namespace that compares favorably to the source name or identifier of the data slice. The storage unit can next determine whether this intended memory device is available or unavailable. If the intended memory device is determine to be available, the data slice is written to the home storage space of the intended memory device. If the intended memory device is determine to be unavailable, the storage unit can determine which other memory device has a lodged namespace that compares favorably to the data slice and/or that compares favorably to the home namespace of the intended memory device. The storage unit can then facilitate storage of the data slice in the lodged storage of this other memory device.

This mechanism for writing data designated for unavailable memory devices as lodged data slices for temporary storage in lodged storage space is advantageous, as it reduces expensive network and CPU overhead and the long scanning cycle to find missing slices that would be required if a rebuilding unit were to instead reconstruct these data slices from other storage units for redistribution back to their home memory devices. After memory device failure, the storage unit has full knowledge of incoming writes, and is thus capable of performing local community level health-recovery locally, in a timely fashion without relying on a foreign aid from a separate rebuild unit, via the network.

A listing function can be synchronized based on this data slice being stored in lodged storage of the other memory device. Alternatively, the synchronization can occur directly in response to determining a memory device is unavailable and/or in response to migrating the home data slices of a first memory device to one or more other memory devices if the first memory device is failing and/or will soon become unavailable. As a result of this synchronization, when the listing function is performed by the storage unit on a data slice, the storage unit can determine whether the data slice is stored as a home data slice in its intended memory device or as a lodged data slice in another memory device, to determine whether a data slice is stored by the storage unit. If the data slice can found in the lodged storage space of another other memory device, the storage unit can determine that the data slice is stored and/or that the data slice is not missing as output of the listing function. The listing function can again be synchronized once a previously unavailable memory device again becomes available, and/or once the lodged data slices intended for a newly available memory device are transferred by the storage unit to the home storage space of the newly available memory device, to indicate the portion of the source name range corresponding to the home namespace of the newly available memory device is stored by the newly available memory device.

The storage unit can execute read requests for data slices by first performing the listing function as discussed above and/or can otherwise include determining whether the data slice is currently a home data slice stored in its intended memory device, or a lodged data slice stored in another memory device. Alternatively or in addition, performing the read request can include first determining the intended memory device of the data slice, and determining whether this intended memory device is available. If the intended memory device is available, the data slice is retrieved from the intended memory device, for example, where the storage unit seeks the home storage space intended memory device until the data slice is found. In response to determining the intended memory device is unavailable, performing the read request can further include performing the lodging affinity function for the data slice and/or otherwise determining and seeking the lodged storage space of memory device designated to store the data slice as a lodged data slice. Some or all of these steps can similarly be performed in performing the listing function to determine whether or not a data slice is stored. Once retrieved from the intended and/or other memory device, the data slice can be sent to a requestor of the read request.

Alternatively, performing the read request can include seeking the lodged storage space of the other memory device in response to determining the data slice is not stored in its intended memory device, even if the intended memory device is available. For example, this can be useful in cases where the intended memory device recently became available, but the migration of lodged data slices to the intended memory device for storage is not complete. In some embodiments, if copies of the same data slice are found in both the intended memory device and the other memory device, the most recent revision can be utilized to satisfy the read request. If parallel overwrites and/or transportation occurs in the home storage space and/or in the lodged storage space otherwise occur for the same data slice, the overwrites and/or transportation determined to correspond to the most recent revision is determined to correspond to the current version of the data slice.

If a crash or error occurs when data slices are being transferred from lodged storage space of one or more memory devices to home storage space of a newly available memory device, performing the listing function on a data slice for both the newly available memory device and another memory device from which the data slice is being transferred can return two data slices. A rebuilder unit that requested the listing request locally and/or via the network can receive the result of the listing request. For example, the rebuilder unit can be integrated in a computing device that is facilitating a rebuild within the storage unit via the network, and/or can be implemented within the processing system of the storage unit itself in the performance of functions by the storage unit itself. If the two data slices are returned, the rebuilder unit can ignore the duplicated data slice from the lodged storage space of the other memory device. The next time the storage unit attempts to move the lodged data slice again to the intended memory device, the storage unit can determine this data slice is already stored as a home data slice in the home storage space of the intended memory device as a result of the prior attempt to transfer the data slices. The storage unit can clear the metadata for the data slice stored in the lodged storage space and/or the copy of the data slice stored as a lodged data slice.

A second memory device storing lodged data slices designated for a first unavailable memory device can become unavailable itself. In this case, these lodged data slices may be unavailable for access while the second memory device is unavailable. New data slices designated for storage in a first memory device that is unavailable and further designated in lodged storage of a second memory device that also becomes unavailable can be written to the lodged storage space of a third memory device. For example, a third memory device that includes the home namespace of the second memory device in its lodged namespace can be designated to store and access both the home and lodged slices of the second memory device when the second memory device is unavailable. Alternatively, a different third memory device can be selected for storage of the lodged slices of the second memory device, which can be a different memory device than that designated to store home slices of the second memory device as lodged slices. In some cases, before this second memory device becomes unavailable, its lodged slices can be transferred to the lodged storage space of the third memory device. In some embodiments, the lodged namespace of the third memory device is changed to include the home storage space of the first memory device in response to determining the second memory device is unavailable, unhealthy, and/or failing and further in response to determining that the second memory device is storing lodged data slices designated for the unavailable first memory device.

To help prevent the need for this third memory device, recovery of unavailable memory devices can be throttled based on health and memory pressure on the storage unit and memory devices. The storage unit can determine a time frame for restoration, resources for restoration, can send an alert indicating the need for restoration via the network, and/or can otherwise determine a level of aggressiveness of the restoration based on the health of memory devices storing lodged slices of affected namespace ranges. For example, if a second memory device storing lodged slices of a first unavailable memory device is determined to have low health, the restoration of the first memory device can be more aggressive. For example, if the second memory device storing lodged slices of a first unavailable memory device is determined to have higher health, the restoration of the first memory device can be less aggressive. Once restoration of the first memory device is complete, the lodged slices of the second memory device can be compacted in the lodged storage space in the second memory device.

When a memory device is determined to be replaced via a migration, data slices from its home storage space and lodged storage space are distributed according to the lodging affinity function from another storage unit. Once a new memory device is added, both the migrated data and the new writes in the lodged spaces in other memory devices from the storage unit would be moved to the home space of the new memory device.

In some embodiments, the lodging affinity function dictates that the lodged slices are be distributed across memory devices to balance memory device utilization and the health of the memory devices. The lodged slices' locations can be spread fairly across the memory devices in a storage unit according to determining the combined physical health and data health, for example, to localize fault tolerance. This can be utilized to determine where data should be stored in lodged storage space in the same storage unit when the designated home storage space is unavailable to best minimize risk of data reliability problems.

As used herein, a "stripe" refers to a group of minimum numbers of storage units that are cooperatively responsible for the integrity of data allocated to these storage units according to the dispersed storage error encoding function. This minimum number of storage unit can correspond to the IDA width threshold number, the IDA decode threshold number, or another minimum number associated with the dispersed storage error decoding function. A stripe can be divided into multiple stripe health ranges (SHRs), where each SHR includes a plurality of pillars designate to store data in accordance with the dispersed storage error encoding function. This plurality of pillars of a single SHR can correspond to memory of a plurality of memory devices on one or more storage units of the stripe. One memory device from each storage unit in a stripe can contain slices covering multiple SHRs of the stripe. An SHR is identified to be at risk when a rebuild unit and/or other processing system of the DSN determines that at least a threshold number of pillars from the SHR are missing slices and/or determines that at least a threshold number of its corresponding memory devices or storage units is not in working condition. The health of an SHR can be determined based on the number of pillars from the SHR with missing slices and/or based on the number of its corresponding memory devices or storage units is not in working condition, where a SHR with more available pillars and/or with more of its corresponding memory devices and/or storage units in working condition is more healthy than an SHR with less available pillars and/or with less of its corresponding memory devices and/or storage units in working condition.

Consider an embodiment where the same lodged namespace is hosted by multiple memory devices, such that if a first memory device is not in working condition, the a second memory device with the same lodged range can be selected to store the lodged slices and/or the home slices of the first memory device. The lodging affinity function can set a determined number of holes among memory devices and storage units in the stripe, where this predetermined number of holes is selected to ensure equal distribution of extra load to store lodged slice on memory devices. These holes can correspond to the portions of memory on the memory devices of the storage units that are designated as lodged storage space rather than home storage space.

The lodging affinity function can be utilized to determine where a given data slice is to be stored as a lodged data slice when the home storage space is not available, which can include selecting which one of the plurality of memory devices of the storage unit with lodged namespaces that compare favorably to the source name of the data slice will store the data slice in its lodged storage space. In an example embodiment of the lodged affinity function, affinity applied to a given source, data object, source name, and/or data slice can be determined by seeding a pseudorandom function based on number N, which is determined based on the total number memory devices in storage unit and the average projected failure according to the designed reliability with the error coding function. For example, first ones of the plurality of memory devices of the storage unit with lodged namespaces that compare favorably to the source name of the data slice are more likely to be selected than other ones of this plurality of memory devices in response to the first ones of the plurality of memory devices having lower average projected failure than the second ones of the plurality of memory devices.

In another example embodiment of the lodged affinity function, the entire source name range can be can be grouped into a number N chunks of memory devices and/or the sources can otherwise be grouped into N chunks of memory devices. An ordering of the N chunks of memory devices can be based on the lodger range of each chunk, where each of the N chunks in the ordering progressively covers a larger lodger range and/or a larger lodged namespace than previous ones of the N chunks in the ordering. Each of the N chunks can covers multiple consecutive memory devices. The lodged affinity function can utilize a lookup table to find the lodged location for a particular source based on which of the N chunks includes the lodged namespace it is grouped within.

In some embodiments, if memory device failures are clustered in a few SHRs at time of multiple extensive failures, then next memory device in these SHRs which has the best health would be chosen in performing the lodging affinity function to reduce the risk of losing data. When multiple memory devices have the same health and/or are tied for the best health, then the memory device with the most available space can be selected in performing the lodging affinity function, thus avoiding too much fragmentation. In some embodiments, the lodging affinity function weighs memory device health higher than memory availability in selecting a memory device to store lodged data slices when extensive failures are determined to be occurring and/or when one or more SHRs are determined to be at risk. The lodging affinity function can weigh memory device health lower than memory availability in selecting a memory device to store lodged data slices when extensive failures are occurring and/or when SHRs are not determined to be at risk. The lodging affinity function can thus be configured to assign source names to lodged storage in a fashion that minimizes systematic biases and/or ensures there are no systematic biases which could, over time, lead to some memory devices receiving more slices than other memory devices.

Rather than deterministically selecting either the highest health memory device and/or the memory device with the highest availability for lodged storage of a particular source, the memory device can be selected based on performing a deterministic and/or pseudorandom function in accordance with a plurality of priorities assigned to each of the plurality of memory devices of the storage unit, and/or to each of a subset of the plurality of memory devices that all include a lodged namespace that compares favorably to the source name of data to be stored in lodged storage space. These priorities can be determined as a function of the health of SHRs and the available space of each of the plurality of memory devices and/or of each of the subset of the plurality if memory devices, for example, relative to the other ones of the plurality of memory devices. Higher priority memory devices are more likely to be selected in performing the lodging affinity function than lower priority devices, for example, based on performing a pseudorandom function with higher probability of selection of the higher priority memory devices. Alternatively, a memory device with a highest calculated priority can always be selected by the lodging affinity function.

The weights assigned to health vs. available space in calculating the priority of a particular memory device can be further determined as a function of the current level of failure and/or current risk of one or more SHRs, where memory device health is weighted higher than its space availability in calculating the priority of each memory device as a result of the current level of failure and/or current risk of one or more SHRs being higher, and where memory device health is weighted lower than its space availability in calculating the priority of each memory device as a result of the current level of failure and/or current risk of one or more SHRs being lower.

In some embodiments, alternatively or in addition to utilizing memory device health to determine priority, the current health and/or current risk of failure of one or more SHRs are utilized to determine priority, for example, where a memory device of a particular SHR is selected for storage of lodged data as a result of performing the lodging affinity function in response to determining that this particular SHR is healthier than another SHR that is at risk of failure, and/or in response to determining that this particular SHR is the healthiest SHR. This can be determined by the storage unit based on receiving a notification via the network indicating that one or more SHRs is unhealthy, for example, based on failures of other memory devices in other storage units corresponding to the SHR, and/or indicating that the particular SHR is currently healthy. This can be determined by the storage unit based on locally determining that a plurality of memory devices of the particular SHR and/or other SHRs that are within the storage unit are healthy and/or not failing.

Consider an embodiment where a second memory device is selected to store lodged slices of a first memory device in response to the second memory device being included in an SHR with a highest health. When the previously unavailable first memory device returns online and/or otherwise becomes available, suppose the second memory device containing the lodged slice of this first memory device goes offline and/or becomes otherwise unavailable, making its lodged slices unavailable for transfer back to the first memory device for storage as home data slices. This unavailable lodged space and resulting unavailability of its lodged slices would have less impact on the overall stripe health in response to the second memory device being included in a SHR with a highest health, for example, because a decode threshold number of data slices of data objects stored in memory devices of this SHR are still available for recovery from other memory devices of SHR, despite the unavailability of data slices stored in the lodged space of the second memory device.

To restore tolerance of a memory device, storage unit, or site outage, lodged affinity must be restored. Affinity is restored when, for every source name stored in a DSN memory, each home location for that source holds a slice for that source. Restoration can occurs when each memory devices with occupied lodged space periodically checks the home status of these lodged slices, and progressively restores these lodged slices to their designated home storage space them based on health and/or the load.

In some embodiments, a storage unit's determination of which memory device will store data slices is determined by the storage unit by combining the use of namespace ranges with hashing for failed, failing, and/or otherwise unavailable memory devices. Storage units can utilize namespace ranges to map slice names or other source names to memory devices when memory devices are healthy. For example, if slice names are numeric and a storage unit has five memory devices, the storage unit can place slices with slice names starting with 0-1 on the first memory device; can place slices with slice names starting with 2-3 on the second memory device; can place slices with slice names starting with 4-5 on the third memory device; can place slices with slice names starting with 6-7 on the fourth memory device; and can place slices with slice names starting with 8-9 on the fifth memory device. If all storage units utilize a similar scheme, and if all storage units map their slice for a given source to the same set of memory devices, with one slice per storage unit, then the number of possible combinations of memory devices that data sources can be stored across is reduced, which reduces the probability of data loss. This can correspond to the home namespaces assigned to the memory devices and/or can otherwise be utilized when memory devices are available and/or healthy.

When a first memory device is failed, failing, or otherwise unavailable, the storage unit can keep the same namespace range mapping, but for names that map to the first memory device, the storage unit can apply a hash mapping function to the slice name to determine which of the remaining memory devices the slice should be mapped to while the first memory device is unavailable. This hash mapping function can be performed with consistent hashing, rendezvous hashing, and/or other hash schemes. The hash mapping function can utilize the slice name, the list of available memory devices, and/or weights of each remaining memory device that is still available as input, where the determined one of the remaining memory devices is output of the hash mapping function. The weights can be determined as a function of storage capacity of the remaining memory devices, performance capacity of the remaining memory device, and/or other factors.

In some embodiments, the lodging affinity function discussed herein implements this hash mapping function to determine which memory device will store lodged slices that were designated for storage on a failed, failing, or unavailable memory device. This can be utilized to designate lodged namespaces for some or all available memory devices at a particular time, where the lodged namespaces of memory devices can change at a later time as currently available memory devices, health of memory devices, and/or storage capacity of memory devices changes. Alternatively, lodged namespaces and/or lodges storage spaces are not utilized, and the has mapping function serves to determine the temporary location for a data slice based on conditions determined at that particular time. The weights utilized in performing the hash function can be determined in the same or similar fashion as the priorities assigned to memory devices in performing the lodging affinity function as discussed herein, for example, where the weights are further determined based on SHR health and/or memory device health.

In response to receiving a write requests to write a new data slices, a storage unit can map each new data slice to its designated memory device determined by utilizing the corresponding namespace ranges. As discussed, if the memory device for a new data slice is determined to be healthy, then the new data slice can be written to that memory device directly, for example, as a home data slice. In some embodiments, if the memory device for a new data slice is determined to be unhealthy and/or unavailable for new writes, the list of available memory devices is determined, and/or the weights assigned to each of the list of available memory devices is calculated or otherwise determined, for example, by utilizing current performance capacity and/or current memory capacity determined for the other memory devices. The hash mapping function is applied to the slice name of the new data slice, the list of available memory devices, and/or the corresponding weights for each of the list of available memory devices. The new data slice is stored on the one of the available memory devices outputted by performance of the hash mapping function, for example, as a lodged data slice.

When a first memory device is identified by the storage unit as failed, failing, and/or otherwise unavailable for writes, the storage unit can attempt to move data from this particular memory device to one or more different memory devices. The storage unit accomplishes this by reading each data slice of the first memory device and by performing the hash mapping function to each data slice, the list of available memory devices, and/or the corresponding weights. The storage unit can similarly calculate the corresponding weights in response to determining that the data slices are to be transferred from the first memory device to other storage, for example, by utilizing current performance capacity and/or current memory capacity determined for the other memory devices. Each data slice is written to the one of the available memory devices outputted by performance of the hash mapping function, for example, as a lodged data slice.

In response to receiving a read request for a data slice, the storage unit first maps the slice name to a first memory device using the namespace ranges, for example, to determine that the first memory device is designated for storage of the data slice as a home data slice. If the first memory device designated for storage of the data slice is available, the data slice is read from this memory device directly. In some cases, the first memory device is determined to be unavailable for new writes, but still available for reads, for example, as a result of the first memory device being identified as currently failing but not yet failed. In such cases, data slices of the first memory device may be in the process of migration from the first memory device to other memory devices in accordance with the hash mapping function. Thus, if storage unit determines that the first memory device is determined to be unavailable for new writes, but still available for reads, the storage unit can identify a second memory device that the data slice is designated to be migrated to. The second memory device can be identified to by applying the hash mapping function to the slice name, the determined list of available memory devices, and/or the determined corresponding weights. Once the second memory device is identified, the storage unit can attempt to read the data slice from the second memory device. In some embodiments, the storage unit attempts to read the data slice from the first storage unit first, and identifies and attempts to read the data slice from the second storage unit in response to determining it is not stored on the first storage unit, for example, where data slice is not stored on the first memory device in response to already having been migrated to the second memory device. Alternatively, the storage unit can attempt to read the data slice from the first memory device and this identified second memory device at the same time.

In some embodiments, the second memory device may not be identified by the storage unit if the read request occurs too long after the data slice was migrated to other storage, for example, due to the list of available storage units and/or weights changing in this timeframe, and the hash mapping function outputting the wrong memory device when retroactively applied to the slice name of a read request. In such embodiments, these requests can be queued until the designated memory device is again available and once the data slices are migrated back to the designated memory device. Alternatively, the storage unit can temporarily store the weights and list of available storage units that were utilized in performing the hash mapping function in the transfer while the corresponding storage unit is unavailable, enabling the storage unit to identify the locations of the transferred data slices for retrieval in response to read requests for the entirety of the time that the memory device is unavailable by utilizing these stored values, even if the current state of available storage units changes.

In response to a failed, failing, and/or otherwise unavailable memory device being replaced and/or otherwise becoming available, the storage unit can list all of the data slices on each of the other memory devices. The storage unit can then identify the subset of the list of all of the data slices that are within and/or compare favorably to the namespace range of this newly replaced and/or newly available memory device, which can be determined to correspond to the data slices that were stored on these other memory devices as a result of performing the hash mapping function while the newly available memory device was unavailable. The storage unit can facilitate migration of this identified subset of data slices the newly available memory device.

This hash mapping function is utilized by the storage unit to dictate the memory devices that will store data slices, designated for storage units that are unavailable as lodged data slices as discussed herein. However, the memory devices may not be divided into home storage space and lodged storage space as discussed previously. In some embodiments, all storage space of each memory device can be designated for storage of home data slices and lodged data slices. Thus, when a second memory device is determined to be storing a data slice to be read as a lodged data slice, the storage unit may need to search the entirety of storage space of the second memory device for the data slice to be read.

By utilizing this methodology of applying the hash mapping function when memory devices are unavailable, the workload and data that was originally mapped to a failed, failing, or otherwise unavailable memory device can be evenly or substantially evenly spread among the remaining memory devices as a result of the hash mapping function. This can help ensure that disproportionate levels of data and/or workload are not added to any one memory device. Furthermore, the total amount of data moved within the storage unit as part of the process of moving slices off of unavailable memory devices and/or to a newly available memory device after a failure can be exactly equal to the amount of data that belongs on that memory device, without requiring that any additional data be unnecessarily moved. While the use of the hash mapping function for placing data slices on other memory devices can have an impact on the probability of data loss, this impact can be minor as a result of the hash mapping function only being applied to a small amount of data and/or being applied for a small amount of time while the memory device is unavailable and/or being replaced.

Figure 10:
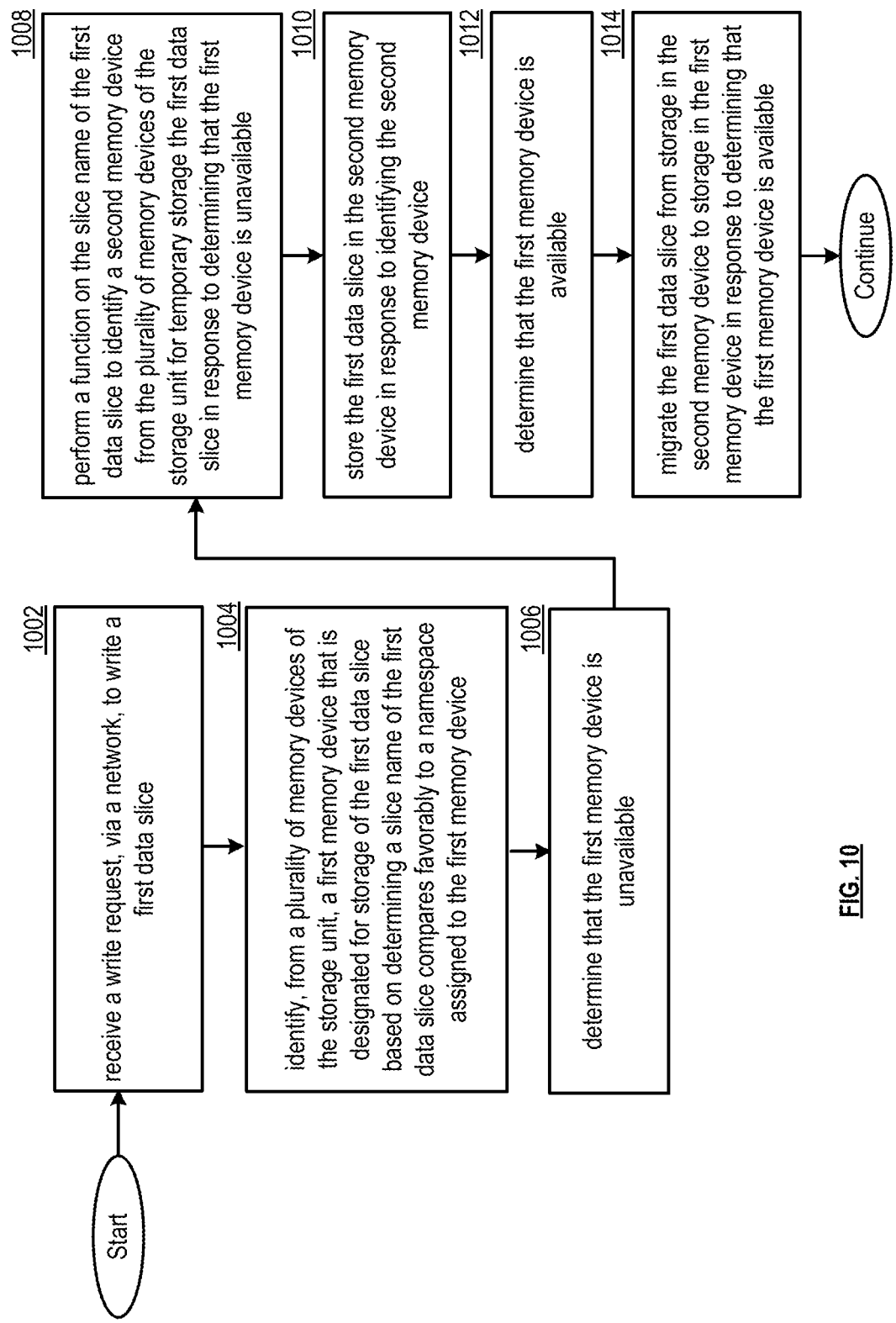
FIG. 10 is a logic diagram of an example of a method of temporarily relocating data in local storage in accordance with the present invention.

FIG. 10 is a flowchart illustrating an example of temporarily relocating slices in local storage. In particular, a method is presented for use in association with one or more functions and features described in conjunction with FIGS. 1-9C, for execution by a storage unit that includes a processor or via another processing system of a dispersed storage network that includes at least one processor and memory that stores instruction that configure the processor or processors to perform the steps described below.

Step 1002 includes receiving a write request, via a network, to write a first data slice. The method further includes executing this write request by performing steps 1004-1010. In particular, step 1004 includes identifying, from a plurality of memory devices of the storage unit, a first memory device that is designated for storage of the first data slice based on determining a slice name of the first data slice compares favorably to a namespace assigned to the first memory device. Step 1006 includes determining that the first memory device is unavailable, and/or is in particular unavailable for writes. Step 1008 includes performing a function on the slice name of the first data slice to identify a second memory device from the plurality of memory devices of the storage unit for temporary storage the first data slice in response to determining that the first memory device is unavailable for writes and/or is otherwise unavailable. Step 1010 includes storing the first data slice in the second memory device in response to identifying the second memory device. At a time after execution of the write request is performed, the method can continue to step 1012, which includes determining that the first memory device is available for writes and/or is otherwise available. Step 1014 includes migrating the first data slice from storage in the second memory device to storage in the first memory device in response to determining that the first memory device is available for writes and/or otherwise available.

In various embodiments, the each of the plurality of memory devices has a total storage space that is divided into a home storage space and a lodged storage space. The lodged storage space of each of the plurality of memory devices is assigned a corresponding lodged namespace. Performing the function on the slice name includes determining that the slice name compares favorably to the lodged namespace of the lodged storage space of the second memory device. Storing the first data slice in the second memory device includes storing the first data slice in the lodged storage space of the second memory device. Migrating the first data slice from storage in the second memory device to storage in the first memory device includes storing the first data slice in the home storage space of the first memory device.

In various embodiments, the method further includes receiving a read request from a requesting entity, via the network, to read the first data slice. The read request is received at a second time that is after execution of the write request and that is before the time that the first memory device is determined to be available. The method includes executing the read request. This includes identifying the first memory device based on determining the slice name of the first data slice compares favorably to a namespace assigned to the first memory device. Executing the read request further includes determining that the first memory device is unavailable, and performing the function on the slice name identify the second memory device in response to determining that the first memory device is unavailable. Executing the read request further includes reading the first data slice from the lodged storage space of the second memory device in response to identifying the second memory device. Executing the read request further includes transmitting the first data slice to the requesting entity, via the network.

In various embodiments, the method further includes receiving a read request from a requesting entity, via the network, to read the first data slice. The read request is received at a second time that is after the time that the first memory device is determined to be available and that is before the first data slice is migrated from storage in the second memory device to storage in the first memory device. The method includes executing the read request. Executing the read request includes identifying the first memory device based on determining the slice name of the first data slice compares favorably to a namespace assigned to the first memory device. Executing the read request further includes determining that the first memory device is available, and attempting to read the first data slice from the home storage space of the first memory device in response to determining that the first memory device is available. Executing the read request further includes determining that the first data slice is not stored in the home storage space of the first memory device, and performing the function on the slice name identify the second memory device in response to determining that the first data slice is not stored in the home storage space of the first memory device. Executing the read request further includes reading the first data slice from the lodged storage space of the second memory device in response to identifying the second memory device, and transmitting the first data slice to the requesting entity, via the network.

In various embodiments, in response to determining that the read of the first data slice is successful from the lodged storage space of the second device and/or in response to determining that the first memory device is available, and yet does store the first data slice as indicated by the unsuccessful read attempt of the first data slice, the method further includes scheduling and/or facilitating migration of the first data slice back to the first memory device for storage in home storage space of the first memory device. This can include facilitating migration of the first data slice from storage in the lodged storage space of the second memory device to storage in the home storage space of the first memory device For example, the first data slice be added to a pending queue to be migrated from the lodged storage space of the second memory device to home storage space of the first memory device once this migration can be performed. If the first data slice is already in this pending queue due to a migration of all lodged slices being in progress, a placement or priority of the first data slice in the queue can be increased and/or the first data slice can be scheduled for more immediate migration in response to receiving the read request for the first data slice and/or in response to otherwise determining that the first data slice is in a higher demand for access than other data slices stored in lodged storage space of the second memory device.

In various embodiments, the method further includes determining a fraction of the total storage space that is designated as lodged storage space each of the plurality of memory devices based on a historical failure rate of each of the memory devices of the storage unit and/or an expected failure rate of each of the memory devices of the storage unit. In various embodiments, the first data slice is one of a plurality of encoded data slices generated by a computing device that performed a dispersed storage error encoding function on a data segment to produce the plurality of encoded data slices. The first data slice is received via the network from the computing device, and a second data slice of the plurality of encoded data slices is transmitted by the computing device to a second storage unit via the network. A first summation of the fraction of the total storage space that is designated as lodged storage space across each of the plurality of memory devices of the storage unit is greater than a second summation of fractions of total storage space that is designated as lodged storage space across each of a plurality of memory devices of the second storage unit. The first summation is greater than the second summation in response to the historical failure rate of the plurality memory devices of the storage unit being greater than a historical failure rate of the plurality memory devices of the second storage unit, and/or the expected failure rate of the plurality memory devices of the storage unit being greater than an expected failure rate of the plurality memory devices of the second storage unit.

In various embodiments, executing the write request further includes determining a list of available memory devices of the storage unit, where the list of available memory devices identifies a subset of the plurality of memory devices. Executing the write request further includes determining a plurality of weights for each of the list of available memory devices. Performing the function on the slice name of the first data slice to identify the second memory device includes performing a hash mapping function on the slice name, on the list of available memory devices, and/or on the plurality of weights.

In various embodiments, the method further includes determining, at a second time before receiving the write request, that the first memory device is failing and/or expected to become unavailable. The method further includes determining the list of available memory devices of the storage unit and determining the plurality of weights for each of the list of available memory devices in response to determining that the first memory device is failing or expected to become unavailable. One memory device in the list of available memory devices is identified for temporary storage of each of a plurality of data slices stored by the first memory device by performing the hash mapping function on a slice name corresponding to the each of the plurality of data slices, on the list of available memory devices, and/or on the plurality of weights. The second memory device is identified for a second data slice of the plurality of data slices stored by the first memory device, and a third memory device is identified for a third data slice of the plurality of data slices stored by the first memory device. The method further include migrating each of the plurality of data slices from storage in the first memory device to storage in the one memory device in the list of available memory devices identified for temporary storage of the each of the plurality of data slices.

In various embodiments, the method further includes receiving, from a requesting entity via the network, a read request to read the second data slice at a third time. The third time is after migrating the second data slice from storage in the first memory device to the second memory device. The third time is before migrating the first data slice from storage in the second memory device to storage in the first memory device. The method includes executing the read request. Executing the read request includes identifying the second memory device by performing the hash mapping function on a slice name of the second data slice, on the list of available memory devices, and/or on the plurality of weights in response to receiving the read request. Executing the read request further includes reading the second data slice from the second memory device in response to identifying the second memory device, and transmitting the second data slice to the requesting entity, via the network.

In various embodiments, the method includes changing designating the first memory device from available for writes to unavailable for writes in response to determining that the first memory device is the failing and/or expected to become unavailable. The method further includes changing designation of the first memory device from available for reads to unavailable for reads in response to completing migration of every one of the plurality of data slices from storage in the first memory device. The third time is before migrating the third data slice from storage in the first memory device to the third memory device. The read request is further executed by attempting to read the second data slice from the first memory device in response to determining the first memory device is designated as available for reads at the third time. The read request is further executed by determining that the second data slice is not stored in the first memory device. The second memory device is identified in response to determining that the second data slice is not stored in the second memory device and further in response to determining that the first memory device is designated as unavailable for writes.

In various embodiments, executing the write request includes determining a health level for each of the plurality of memory devices. Performing the function on the slice name of the first data slice includes performing a lodging affinity function that is a function of the health levels of the plurality of memory devices. The second memory device is identified in response to the second memory device having a health level that compares favorably to a health level threshold. In various embodiments, the second memory device is alternatively and/or additionally identified in response to the second memory device having a most favorable health level of the plurality of memory devices.

In various embodiments, executing the write request includes determining a memory availability level for each the plurality of memory devices. Performing the lodging affinity function is further a function of the memory availability level and includes determining that multiple memory devices of the plurality of memory devices have health levels that compare favorably to the health level threshold. The second memory device is further identified in response to the second memory device having a most favorable memory availability level of the multiple memory devices of the multiple memory devices.

In various embodiments, determining the health level for each of the plurality of memory devices includes identifying at least one stripe health range corresponding to each of the plurality of memory devices. The health level for each memory device of the plurality of memory devices is determined based on a failure risk level of the corresponding at least one stripe health range.

In various embodiments, the first data slice is one of a plurality of encoded data slices generated by a computing device that performed a dispersed storage error encoding function on a data segment to produce the plurality of encoded data slices. The first data slice is received via the network from the computing device. Remaining ones of the plurality of encoded data slices are transmitted by the computing device to a plurality of other storage units for storage. Executing the write request further includes determining the failure risk level for at least one stripe health range in response to receiving failure risk notification from the computing device. The failure risk notification indicates that a first stripe health range that includes a third memory device in the plurality of memory devices is unfavorable. The computing device generates the failure risk notification for transmission to the storage unit in response to the computing device determining that at least a threshold number of pillars of the first stripe health range are unavailable in at least a threshold number of other ones of the plurality of other storage units. The health level of the second memory device is determined to be higher than the health level of the third memory device in response to the failure risk notification identifying the first stripe health range that includes the third memory device.

In various embodiments, the method further includes receiving a second write request, via the network, to write a second data slice. The method includes executing the second write request. The second write request is executed by identifying, from the plurality of memory devices of the storage unit, a third memory device that is designated for storage of the second data slice based on determining a slice name of the second data slice compares favorably to a namespace assigned to the third memory device. A function is performed on the slice name of the second data slice to identify a fourth memory device from the plurality of memory devices of the storage unit for temporary storage the second data slice in response to determining that the third memory device is unavailable. The second data slice in the fourth memory device in response to identifying the fourth memory device.

In various embodiments, the method further includes determining a first subset of the plurality of memory devices that are unavailable, where the first subset of the plurality of memory devices includes the first memory device and the third memory device. The method further includes determining a second subset of the plurality of memory devices of the storage unit that are temporarily storing data slices that compare favorably to namespaces assigned to the first subset of the plurality of memory devices that are unavailable, where the second subset of the plurality of memory devices includes the second memory device and the fourth memory device. The method further includes determining a health level for each of the second subset of the plurality of memory devices. The method further includes determine restoration requirements for each of the first subset of the plurality of memory devices based on the health level of a corresponding one of the second subset of the plurality of memory devices. The restoration requirements can indicate a required time frame for restoration of each of a plurality of unavailable memory devices and/or an amount of resources of the storage unit allocated to restoration of each of a plurality of unavailable memory devices. In response to the health level of the second memory device being lower than, more likely to fail than, and/or otherwise less favorable than the health level of the fourth memory device, the restoration requirements indicate a first required time frame for restoration of the first memory device that is smaller than a first required time frame for restoration of the third memory device; a first amount of resources of the storage unit allocated to restoration of the first memory device is larger than a second amount of resources of the storage unit allocated to restoration of the third memory device; and/or can otherwise dictate that the first memory device be prioritized for restoration more highly than the third memory device as a result of the second memory device having a less favorable health than the fourth memory device. The method can further include facilitating restoration of each of the first subset of the plurality of memory devices in accordance with the restoration requirements, where the first memory device is determined to be available in response to successful completion of restoration of the first memory device.

In various embodiments, the method includes receiving a listing request for the first data slice via the network, The listing request is received at a second time that is after the time that the first memory device is determined to be available. The method further includes executing the listing request by performing a listing function. The output of the listing function indicates that the first data slice is stored in the first memory device and the second memory device in response to a restoration of the first memory device being in progress. The method further includes generating an updated output by removing the second memory device from the output in response to the output indicating duplicate storage of the first data slice. The method can further include facilitating resynchronizing of the listing function in response to the output indicating duplicate storage of the first data slice. The method further includes transmitting, via the network, a notification indicating the updated output and/or the first data slice.

In various embodiments, a non-transitory computer readable storage medium includes at least one memory section that stores operational instructions that, when executed by a processing system of a dispersed storage network (DSN) that includes a processor and a memory, causes the processing system to receive a write request, via a network, to write a first data slice. A first memory device that is designated for storage of the first data slice is identified from a plurality of memory devices of the storage unit based on determining a slice name of the first data slice compares favorably to a namespace assigned to the first memory device. It is determined that the first memory device is unavailable, and a function on the slice name of the first data slice to identify a second memory device from the plurality of memory devices of the storage unit for temporary storage the first data slice in response to determining that the first memory device is unavailable. The first data slice is stored in the second memory device in response to identifying the second memory device. It is determined that the first memory device is available at a time after storing the first data slice in the second memory device. The first data slice is migrated from storage in the second memory device to storage in the first memory device in response to determining that the first memory device is available.

Figure 11:
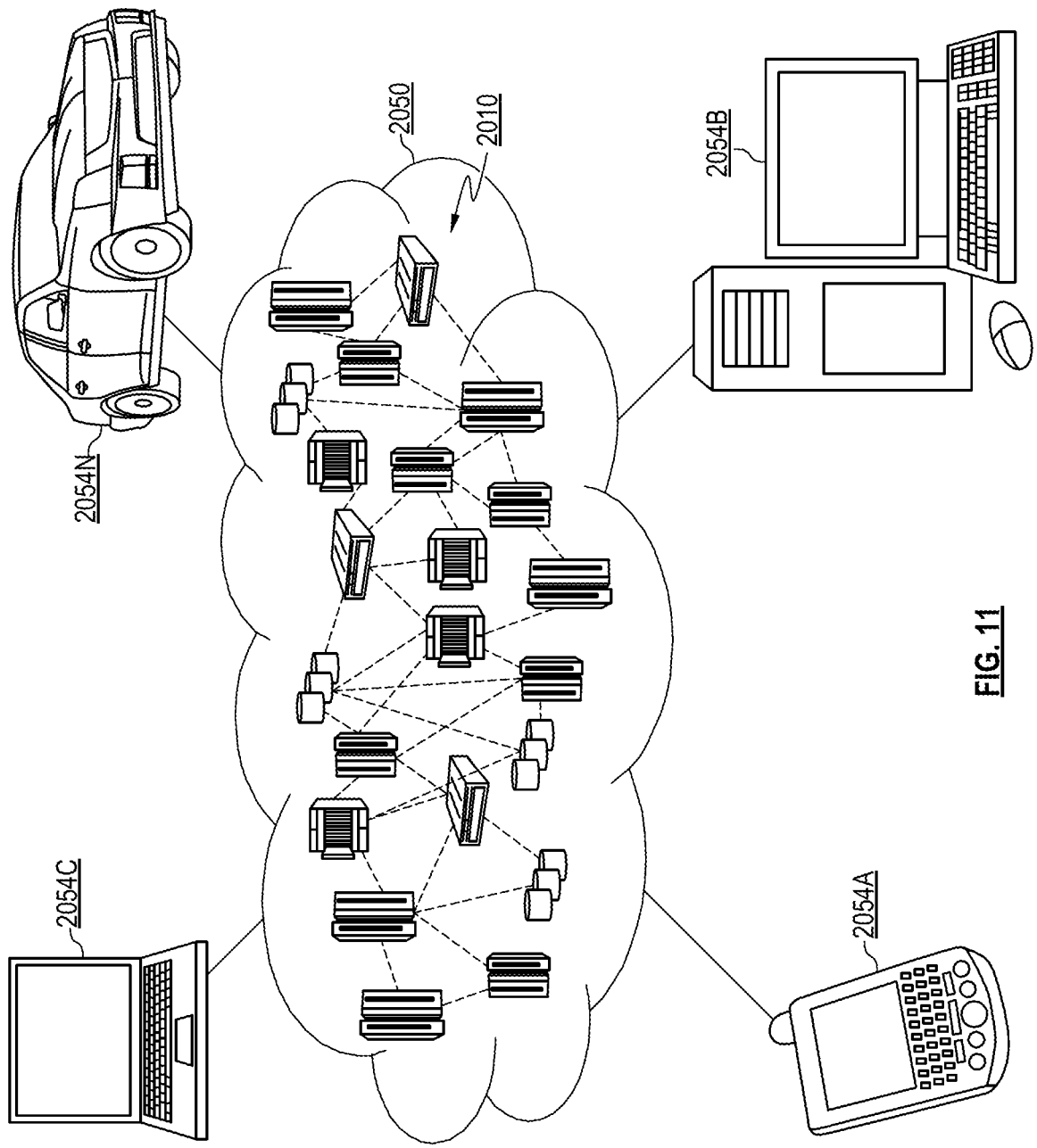
FIG. 11 depicts a cloud computing environment according to an embodiment of the present invention.

FIG. 11 presents an illustrative cloud computing environment 2050. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 11 are intended to be illustrative only and that computing nodes 2010 and cloud computing environment 2050 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In various embodiments, the DSN can be implemented by utilizing the cloud computing environment 2050 and/or can communicate with cloud computing environment 2050. Alternatively or in addition, the plurality of computing devices 12-16 of FIG. 1, the managing unit of FIG. 1, and/or the integrity processing unit 20 of FIG. 1, and/or storage units 36 can be implemented by utilizing cloud computing nodes 2010, personal digital assistant (PDA) or cellular telephone 2054A, desktop computer 2054B, laptop computer 2054C, and/or automobile computer system 2054N. In various embodiments, the cloud computing nodes 2010, personal digital assistant (PDA) or cellular telephone 2054A, desktop computer 2054B, laptop computer 2054C, and/or automobile computer system 2054N can communicate by utilizing network 24 of FIG. 1.

Figure 12:
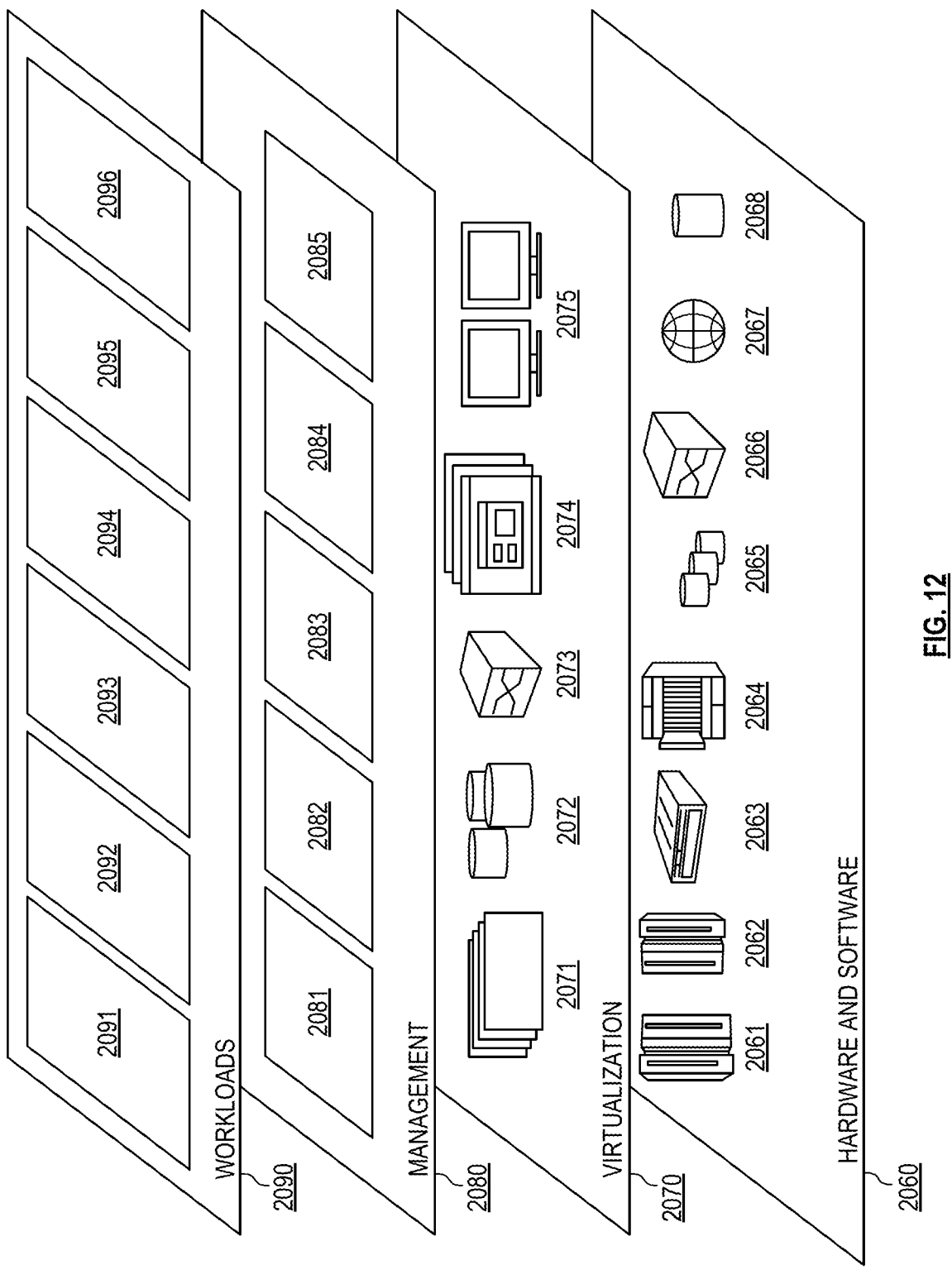
FIG. 12 depicts abstraction model layers according to an embodiment of the present invention.

Referring now to FIG. 12, a set of functional abstraction layers provided by cloud computing environment 2050 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068. In some embodiments, one or more hardware components can be implemented by utilizing the computing device 2300 of FIG. 13.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091;

software development and lifecycle management 2092; virtual classroom education delivery 2093; data analytics processing 2094; transaction processing 2095; and temporary data relocation 2096. In some embodiments, the DSN 10 can utilize utilizing the cloud computing environment 2050, for example, by utilizing the temporary data relocation 2096 of the workloads layer 2090 of FIG. 12 to facilitate temporary relocation of data in local storage in the DSN, based on latency and/or throughput, as described in conjunction with FIGS. 1-10, where some or all computing devices 12-16 of FIG. 1 and/or where one or more storage units 936 of FIG. 9 communicate with the network via a corresponding node 2010 of the cloud computing environment 2050.

Figure 13:
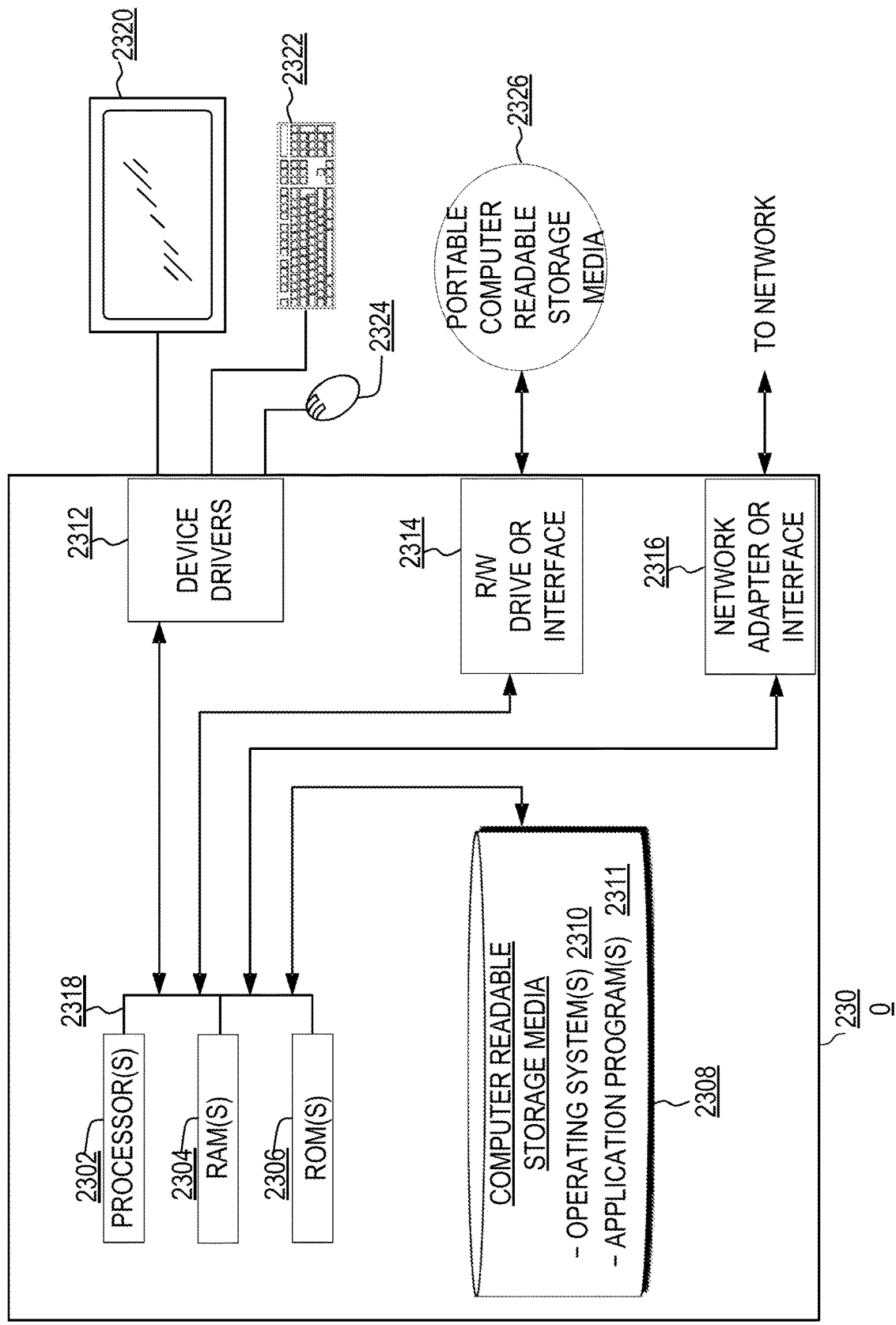
FIG. 13 depicts a block diagram of a computing device according to various embodiments of the present invention.

FIG. 13 depicts a block diagram of components of a computing device 2300, which can be utilized to implement some or all of the cloud computing nodes 2010, some or all of the computing devices 54A-N of FIG. 11, and/or to implement other computing devices described herein in accordance with an embodiment of the present invention. The computing device 2300 can be utilized to implement some or all of the plurality of computing devices 12-16 of FIG. 1, the DS client module 34 of FIG. 1, the managing unit of FIG. 1, the integrity processing unit 20 of FIG. 1, and/or storage units 36 of FIG. 1. For example the computing core 26 of FIG. 2 can be implemented by utilizing the computing device 2300. It should be appreciated that FIG. 13 provides only an illustration of one implementation and does not imply any limitations with regard to the environments in which different embodiments may be implemented. Many modifications to the depicted environment may be made.

Computing device 2300 can include one or more processors 2302, one or more computer-readable RAMs 2304, one or more computer-readable ROMs 2306, one or more computer readable storage media 2308, device drivers 2312, read/write drive or interface 2314, and network adapter or interface 2316, all interconnected over a communications fabric 2318. Communications fabric 2318 can be implemented with any architecture designed for passing data and/or control information between processors (such as microprocessors, communications and network processors, etc.), system memory, peripheral devices, and any other hardware components within the system.

One or more operating systems 2310 and/or application programs 2311, such as network application server software 2067 and database software 2068, are stored on one or more of the computer readable storage media 2308 for execution by one or more of the processors 2302 via one or more of the respective RAMs 2304 (which typically include cache memory). In the illustrated embodiment, each of the computer readable storage media 2308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 2300 can also include a R/W drive or interface 2314 to read from and write to one or more portable computer readable storage media 2326. Application programs 2311 on computing devices 2300 can be stored on one or more of the portable computer readable storage media 2326, read via the respective R/W drive or interface 2314 and loaded into the respective computer readable storage media 2308.

Computing device 2300 can also include a network adapter or interface 2316, such as a TCP/IP adapter card or wireless communication adapter. Application programs 2311 on computing devices 2054A-N can be downloaded to the computing device from an external computer or external storage device via a network (for example, the Internet, a local area network or other wide area networks or wireless networks) and network adapter or interface 2316. From the network adapter or interface 2316, the programs may be loaded into the computer readable storage media 2308. The network may comprise copper wires, optical fibers, wireless transmission, routers, firewalls, switches, gateway computers and edge servers.

Computing device 2300 can also include a display screen 2320, a keyboard or keypad 2322, and a computer mouse or touchpad 2324. Device drivers 2312 interface to display screen 2320 for imaging, to keyboard or keypad 2322, to computer mouse or touchpad 2324, and/or to display screen 2320 for pressure sensing of alphanumeric character entry and user selections. The device drivers 2312, R/W drive or interface 2314, and network adapter or interface 2316 can comprise hardware and software stored in computer readable storage media 2308 and/or ROM 2306.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a storage unit that includes a processor, the method comprises:
    executing a write request to write a first data slice by:
        identifying, from a plurality of memory devices of the storage unit, a first memory device that is designated for storage of the first data slice based on determining a slice name of the first data slice compares favorably to a namespace assigned to the first memory device;
        determining that the first memory device is unavailable;
        performing a function on the slice name of the first data slice to identify a second memory device from the plurality of memory devices of the storage unit for temporary storage the first data slice in response to determining that the first memory device is unavailable; and
        storing the first data slice in the second memory device in response to identifying the second memory device;
    determining that the first memory device is available at a time after execution of the write request; and
    migrating the first data slice from storage in the second memory device to storage in the first memory device in response to determining that the first memory device is available.

2. The method of claim 1, wherein each of the plurality of memory devices has a total storage space that is divided into a home storage space and a lodged storage space, wherein the lodged storage space of each of the plurality of memory devices is assigned a corresponding lodged namespace, wherein performing the function on the slice name includes determining that the slice name compares favorably to the lodged namespace of the lodged storage space of the second memory device, wherein storing the first data slice in the second memory device includes storing the first data slice in the lodged storage space of the second memory device, and wherein migrating the first data slice from storage in the second memory device to storage in the first memory device includes storing the first data slice in the home storage space of the first memory device.

3. The method of claim 2, further comprising:
    receiving a read request from a requesting entity, via a network, to read the first data slice, wherein the read request is received at a second time that is after execution of the write request and that is before the time that the first memory device is determined to be available; and
    executing the read request by:
        identifying the first memory device based on determining the slice name of the first data slice compares favorably to a namespace assigned to the first memory device;
        determining that the first memory device is unavailable;
        performing the function on the slice name identify the second memory device in response to determining that the first memory device is unavailable;
        reading the first data slice from the lodged storage space of the second memory device in response to identifying the second memory device; and
        transmitting the first data slice to the requesting entity, via the network.

4. The method of claim 2, further comprising:
    receiving a read request from a requesting entity, via a network, to read the first data slice, wherein the read request is received at a second time that is after the time that the first memory device is determined to be available and that is before the first data slice is migrated from storage in the second memory device to storage in the first memory device; and
    executing the read request by:
        identifying the first memory device based on determining the slice name of the first data slice compares favorably to a namespace assigned to the first memory device;
        determining that the first memory device is available;
        attempting to read the first data slice from the home storage space of the first memory device in response to determining that the first memory device is available;
        determining that the first data slice is not stored in the home storage space of the first memory device;
        performing the function on the slice name identify the second memory device in response to determining that the first data slice is not stored in the home storage space of the first memory device;
        reading the first data slice from the lodged storage space of the second memory device in response to identifying the second memory device;
        transmitting the first data slice to the requesting entity, via the network; and
        facilitating migration of the first data slice from storage in the lodged storage space of the second memory device to storage in the home storage space of the first memory device in response to successfully reading the first data slice from the lodged storage space of the second memory device and in further response to determining the first memory device is available.

5. The method of claim 2, further comprising:
    determining a fraction of the total storage space that is designated as lodged storage space each of the plurality of memory devices based on at least one of: a historical failure rate of each of the memory devices of the storage unit, or an expected failure rate of each of the memory devices of the storage unit.

6. The method of claim 5, wherein the first data slice is one of a plurality of encoded data slices generated by a computing device that performed a dispersed storage error encoding function on a data segment to produce the plurality of encoded data slices, wherein the first data slice is received via a network from the computing device, and wherein a second data slice of the plurality of encoded data slices is transmitted by the computing device to a second storage unit via the network, wherein a first summation of the fraction of the total storage space that is designated as lodged storage space across each of the plurality of memory devices of the storage unit is greater than a second summation of fractions of total storage space that is designated as lodged storage space across each of a plurality of memory devices of the second storage unit, and wherein the first summation is greater than the second summation in response to one of: the historical failure rate of the plurality memory devices of the storage unit being greater than a historical failure rate of the plurality memory devices of the second storage unit, or the expected failure rate of the plurality memory devices of the storage unit being greater than an expected failure rate of the plurality memory devices of the second storage unit.

7. The method of claim 1, wherein executing the write request further includes:
determining a list of available memory devices of the storage unit, wherein the list of available memory devices identifies a subset of the plurality of memory devices; and
determining a plurality of weights for each of the list of available memory devices;
wherein performing the function on the slice name of the first data slice to identify the second memory device includes performing a hash mapping function on the slice name, on the list of available memory devices, and on the plurality of weights.

8. The method of claim 7, further comprising:
determining, at a second time before receiving the write request, that the first memory device is one of: failing or expected to become unavailable;
determining the list of available memory devices of the storage unit and determining the plurality of weights for each of the list of available memory devices in response to determining that the first memory device is the one of: failing or expected to become unavailable;
identifying one memory device in the list of available memory devices for temporary storage of each of a plurality of data slices stored by the first memory device by performing the hash mapping function on a slice name corresponding to the each of the plurality of data slices, on the list of available memory devices, and on the plurality of weights, wherein the second memory device is identified for a second data slice of the plurality of data slices stored by the first memory device, and wherein a third memory device is identified for a third data slice of the plurality of data slices stored by the first memory device; and
migrating each of the plurality of data slices from storage in the first memory device to storage in the one memory device in the list of available memory devices identified for temporary storage of the each of the plurality of data slices.

9. The method of claim 8, further comprising:
receiving, from a requesting entity via a network, a read request to read the second data slice at a third time, wherein the third time is after migrating the second data slice from storage in the first memory device to the second memory device, and wherein the third time is before migrating the first data slice from storage in the second memory device to storage in the first memory device; and
executing the read request by:
identifying the second memory device by performing the hash mapping function on a slice name of the second data slice, on the list of available memory devices, and on the plurality of weights in response to receiving the read request;
reading the second data slice from the second memory device in response to identifying the second memory device; and
transmitting the second data slice to the requesting entity, via the network.

10. The method of claim 9, wherein the method further comprises:
changing designating the first memory device from available for writes to unavailable for writes in response to determining that the first memory device is the one of: failing or expected to become unavailable; and
changing designation of the first memory device from available for reads to unavailable for reads in response to completing migration of every one of the plurality of data slices from storage in the first memory device;
wherein third time is before migrating the third data slice from storage in the first memory device to the third memory device, and wherein the read request is further executed by:
attempting to read the second data slice from the first memory device in response to determining the first memory device is designated as available for reads at the third time; and
determining that the second data slice is not stored in the first memory device, wherein the second memory device is identified in response to determining that the second data slice is not stored in the second memory device and further in response to determining that the first memory device is designated as unavailable for writes.

11. The method of claim 1, wherein executing the write request includes:
determining a health level for each of the plurality of memory devices;
wherein performing the function on the slice name of the first data slice includes performing a lodging affinity function that is a function of the health levels of the plurality of memory devices, wherein the second memory device is identified in response to the second memory device having a health level that compares favorably to a health level threshold.

12. The method of claim 11, wherein the second memory device is identified in response to the second memory device having a most favorable health level of the plurality of memory devices.

13. The method of claim 11, wherein executing the write request includes:
determining a memory availability level for each the plurality of memory devices;
wherein performing the lodging affinity function is further a function of the memory availability level and includes determining that multiple memory devices of the plurality of memory devices have health levels that compare favorably to the health level threshold, wherein the second memory device is further identified in response to the second memory device having a most favorable memory availability level of the multiple memory devices of the multiple memory devices.

14. The method of claim 11, wherein executing the write request includes:
wherein determining the health level for each of the plurality of memory devices includes identifying at least one stripe health range corresponding to each of the plurality of memory devices, wherein the health level for each memory device of the plurality of memory devices is determined based on a failure risk level of the corresponding at least one stripe health range.

15. The method of claim 14, wherein the first data slice is one of a plurality of encoded data slices generated by a computing device that performed a dispersed storage error encoding function on a data segment to produce the plurality of encoded data slices, wherein the first data slice is received via a network from the computing device, wherein remaining ones of the plurality of encoded data slices are transmitted by the computing device to a plurality of other storage units for storage, and wherein the executing the write request further includes:
determining the failure risk level for at least one stripe health range in response to receiving failure risk notification from the computing device, wherein the failure risk notification indicates that a first stripe health range that includes a third memory device in the plurality of memory devices is unfavorable, wherein the computing device generates the failure risk notification for transmission to the storage unit in response to the computing device determining that at least a threshold number of pillars of the first stripe health range are unavailable in at least a threshold number of other ones of the plurality of other storage units;
wherein the health level of the second memory device is determined to be higher than the health level of the third memory device in response to the failure risk notification identifying the first stripe health range that includes the third memory device.

16. A processing system of a storage unit comprises:
a plurality of memory devices;
at least one processor; and
a memory that stores operational instructions, that when executed by the at least one processor cause the processing system to:
execute a write request to write a first data slice by:
identifying, from the plurality of memory devices of the storage unit, a first memory device that is designated for storage of the first data slice based on determining a slice name of the first data slice compares favorably to a namespace assigned to the first memory device;
determining that the first memory device is unavailable;
performing a function on the slice name of the first data slice to identify a second memory device from the plurality of memory devices of the storage unit for temporary storage the first data slice in response to determining that the first memory device is unavailable; and
storing the first data slice in the second memory device in response to identifying the second memory device;
determine that the first memory device is available at a time after execution of the write request; and
migrate the first data slice from storage in the second memory device to storage in the first memory device in response to determining that the first memory device is available.

17. The storage unit of claim 16, wherein the operational instructions, when executed by the at least one processor, further cause the processing system to:
receive a second write request, via a network, to write a second data slice;
execute the second write request by:
identifying, from the plurality of memory devices of the storage unit, a third memory device that is designated for storage of the second data slice based on determining a slice name of the second data slice compares favorably to a namespace assigned to the third memory device;
determining that the third memory device is unavailable;
performing a function on the slice name of the second data slice to identify a fourth memory device from the plurality of memory devices of the storage unit for temporary storage the second data slice in response to determining that the third memory device is unavailable; and
storing the second data slice in the fourth memory device in response to identifying the fourth memory device;
determine a first subset of the plurality of memory devices that are unavailable, wherein the first subset of the plurality of memory devices includes the first memory device and the third memory device;
determine a second subset of the plurality of memory devices of the storage unit that are temporarily storing data slices that compare favorably to namespaces assigned to the first subset of the plurality of memory devices that are unavailable, wherein the second subset of the plurality of memory devices includes the second memory device and the fourth memory device;
determine a health level for each of the second subset of the plurality of memory devices;
determine restoration requirements for each of the first subset of the plurality of memory devices based on the health level of a corresponding one of the second subset of the plurality of memory devices, wherein the restoration requirements indicate at least one of: a required time frame for restoration of each of a plurality of unavailable memory devices or an amount of resources of the storage unit allocated to restoration of each of a plurality of unavailable memory devices, and wherein, in response to the health level of the second memory device being less favorable than the health level of the fourth memory device, the restoration requirements indicate at least one of: a first required time frame for restoration of the first memory device that is smaller than a first required time frame for restoration of the third memory device, or a first amount of resources of the storage unit allocated to restoration of the first memory device is larger than a second amount of resources of the storage unit allocated to restoration of the third memory device;
facilitating restoration of each of the first subset of the plurality of memory devices in accordance with the restoration requirements, wherein the first memory device is determined to be available in response to successful completion of restoration of the first memory device.

18. The storage unit of claim 16, wherein the operational instructions, when executed by the at least one processor, further cause the processing system to:
- receive a listing request for the first data slice via a network, wherein the listing request is received at a second time that is after the time that the first memory device is determined to be available;
- execute the listing request by performing a listing function, wherein the output of the listing function indicates that the first data slice is stored in the first memory device and the second memory device in response to a restoration of the first memory device being in progress;
- generating an updated output by removing the second memory device from the output in response to the output indicating duplicate storage of the first data slice;
- facilitating resynchronizing of the listing function in response to the output indicating duplicate storage of the first data slice; and
- transmitting, via the network, a notification indicating the updated output.

19. The storage unit of claim 16, wherein executing the write request includes:
- determining a health level for each of the plurality of memory devices;
- wherein performing the function on the slice name of the first data slice includes performing a lodging affinity function that is a function of the health levels of the plurality of memory devices, wherein the second memory device is identified in response to the second memory device having a health level that compares favorably to a health level threshold.

20. A non-transitory computer readable storage medium comprises:
- at least one memory section that stores operational instructions that, when executed by a processing system of a network that includes a processor and a memory, causes the processing system to:
- execute a write request to write a first data slice by:
  - identifying, from a plurality of memory devices, a first memory device that is designated for storage of the first data slice based on determining a slice name of the first data slice compares favorably to a namespace assigned to the first memory device;
  - determining that the first memory device is unavailable;
  - performing a function on the slice name of the first data slice to identify a second memory device from the plurality of memory devices for temporary storage the first data slice in response to determining that the first memory device is unavailable; and
  - storing the first data slice in the second memory device in response to identifying the second memory device;
- determine that the first memory device is available at a time after execution of the write request; and
- migrate the first data slice from storage in the second memory device to storage in the first memory device in response to determining that the first memory device is available.

* * * * *